US012715727B2

(12) United States Patent
Preliasco et al.

(10) Patent No.: US 12,715,727 B2
(45) Date of Patent: Aug. 25, 2026

(54) MEDIA SUPPLY WITH SELF-LOCKING MEDIA CORE FOR MEDIA PROCESSING DEVICES

(71) Applicant: ZEBRA TECHNOLOGIES CORPORATION, Lincolnshire, IL (US)

(72) Inventors: Richard J. Preliasco, North Kingstown, RI (US); Raymond E. Maynard, Westerly, RI (US); David F. Beck, Exeter, RI (US); Anthony Ross Helberg, Attleboro, MA (US); Matthew D. Corvese, Cranston, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 54 days.

(21) Appl. No.: 18/390,356

(22) Filed: Dec. 20, 2023

(65) Prior Publication Data

US 2025/0206565 A1 Jun. 26, 2025

(51) Int. Cl.
*B65H 75/26* (2006.01)
*B41J 15/02* (2006.01)
(Continued)

(52) U.S. Cl.
CPC .............. *B65H 75/26* (2013.01); *B41J 15/02* (2013.01); *B41J 15/04* (2013.01); *B41J 15/042* (2013.01);
(Continued)

(58) Field of Classification Search
CPC ........ B65H 75/00; B65H 75/02; B65H 75/08; B65H 75/10; B65H 75/18; B65H 75/185; B65H 75/2254; B65H 75/2272; B65H 75/2281; B65H 75/26; B65H 75/30; B65H 2301/4133; B65H 2301/41335; B65H 2405/45; B65H 2405/454; B65H 2405/461; B65H 2701/534; B65H 2701/535; B65H 16/04; B65H 16/06; B65H 18/026;
(Continued)

(56) References Cited

U.S. PATENT DOCUMENTS 1,769,416 A * 7/1930 Clinton .................. B65H 75/14
242/613.2
2,052,541 A * 8/1936 Roberts .................. B65H 75/10
242/613.5

(Continued)

OTHER PUBLICATIONS

PCT/US2024/059037—International Search Report, USPTO ISA/US, Jan. 31, 2025.

(Continued)

*Primary Examiner* — Emmanuel M Marcelo
*Assistant Examiner* — Raveen J Dias

(57) ABSTRACT

A supply of printable media including a self-locking core. A web of printable media is wound about the self-locking core. The media including a printable surface on first side and an adhesive on a second side. The self-locking core includes a cylindrical body defining a center axis, the cylindrical body having an outer surface and an inner surface. A locking member formed along the inner surface of the body. The locking member extends radially inward towards the center axis and forms a helix having a non-zero helix angle along the inner surface.

20 Claims, 18 Drawing Sheets

(51) Int. Cl.

| | |
|---|---|
| ***B41J 15/04*** | (2006.01) |
| ***B65H 16/04*** | (2006.01) |
| ***B65H 18/02*** | (2006.01) |
| ***B65H 75/02*** | (2006.01) |
| ***B65H 75/10*** | (2006.01) |
| ***B65H 75/18*** | (2006.01) |

(52) U.S. Cl.

CPC ............. *B65H 75/02* (2013.01); *B65H 75/10* (2013.01); *B65H 75/18* (2013.01); *B65H 16/04* (2013.01); *B65H 18/026* (2013.01); *B65H 2301/41335* (2013.01); *B65H 2405/45* (2013.01); *B65H 2405/461* (2013.01); *B65H 2701/18442* (2013.01); *B65H 2701/51* (2013.01)

(58) Field of Classification Search

CPC .......... B65H 18/028; B65H 2701/1844; B65H 2701/18442; B65H 2701/51; B65H 2701/52; B41J 15/00; B41J 15/02; B41J 15/04; B41J 15/042; B41J 33/12; B41J 33/16; B41J 35/28

USPC ... 242/597.2, 597.5, 597.6, 599, 599.4, 600, 242/602.2, 609, 609.3, 611.2, 613, 613.1, 242/613.2, 613.5; 400/207, 223, 242, 400/611, 613

See application file for complete search history.

(56) References Cited

U.S. PATENT DOCUMENTS

| | | | | |
|---|---|---|---|---|
| 2,585,999 A * | 2/1952 | Bunch | B65H 75/2218 | 242/610.6 |
| 3,106,363 A * | 10/1963 | Epstein | B65H 75/10 | 242/613.5 |
| 3,107,874 A * | 10/1963 | Wilke | A61F 15/002 | 242/610.6 |
| 3,232,082 A * | 2/1966 | Fallscheer | D06B 23/042 | 68/198 |
| 3,312,410 A * | 4/1967 | Strothmann | B65H 75/30 | 242/610.6 |
| 3,433,355 A * | 3/1969 | Werter | B65H 75/10 | 242/571 |
| 3,464,450 A * | 9/1969 | Steffenini | F16L 9/18 | 138/172 |
| 3,556,429 A * | 1/1971 | Steffenini | F16L 9/18 | 242/118.31 |
| 3,792,822 A * | 2/1974 | Underhill | A47K 10/3836 | 248/309.2 |
| 4,316,759 A | 2/1982 | Becker et al. | | |
| 4,971,265 A | 11/1990 | Koch | | |
| 5,415,357 A * | 5/1995 | Smith, Jr. | B65H 23/06 | 242/422.4 |
| 5,501,406 A * | 3/1996 | Henning | D06B 23/045 | 68/198 |
| 5,788,384 A * | 8/1998 | Goodwin | B65C 11/0289 | 400/208 |
| 5,820,277 A | 10/1998 | Schulte | | |
| 6,109,801 A * | 8/2000 | Mabit | B65H 75/18 | 400/248 |
| 6,305,638 B1 * | 10/2001 | Rodriguez | B65H 75/08 | 242/530.4 |
| 6,923,582 B2 * | 8/2005 | Pomfret | B41J 17/24 | 400/242 |
| 6,997,629 B2 * | 2/2006 | Bungert | B41J 35/28 | 242/600 |
| 7,036,766 B2 * | 5/2006 | Place | B65H 75/10 | 242/613.5 |
| 7,350,992 B2 * | 4/2008 | Ward | B41J 15/04 | 400/202.1 |
| 8,029,201 B2 * | 10/2011 | Chen | B41J 33/14 | 242/573.7 |
| 8,424,796 B2 * | 4/2013 | Witwer | B65H 75/2281 | 242/118.6 |
| 8,783,600 B1 * | 7/2014 | Myron | A47K 10/16 | 242/596.7 |
| 8,783,981 B2 * | 7/2014 | Watson | B41J 15/02 | 242/571 |
| 10,195,883 B2 * | 2/2019 | Cronin | B65H 19/102 | |
| 12,103,799 B2 * | 10/2024 | Matsuhisa | B65H 18/026 | |
| 2001/0042810 A1 * | 11/2001 | Christensen | B65H 75/10 | 242/597.2 |
| 2003/0127555 A1 * | 7/2003 | Squires | B65H 75/30 | 242/597.6 |
| 2005/0249537 A1 * | 11/2005 | Pomfret | B41J 17/24 | 400/242 |
| 2009/0218435 A1 * | 9/2009 | Morgan | B65H 75/30 | 242/610.6 |
| 2012/0045266 A1 | 2/2012 | Watson et al. | | |
| 2013/0272766 A1 * | 10/2013 | Tanaka | B41J 15/02 | 400/242 |
| 2013/0291790 A1 * | 11/2013 | Tanaka | B41F 17/10 | 118/40 |
| 2014/0209730 A1 * | 7/2014 | Tanaka | B41J 15/16 | 242/540 |
| 2015/0053351 A1 * | 2/2015 | Tanaka | B65H 35/0026 | 156/538 |
| 2015/0136894 A1 | 5/2015 | Kling | | |
| 2015/0210504 A1 * | 7/2015 | Yu Chen | B65H 75/185 | 242/600 |
| 2015/0246561 A1 * | 9/2015 | Kawai | B41J 11/703 | 347/16 |
| 2017/0136795 A1 * | 5/2017 | Paulson | B41J 32/00 | |
| 2018/0154662 A1 * | 6/2018 | Ho | B41J 15/046 | |
| 2018/0222713 A1 * | 8/2018 | Toye | B65H 75/08 | |

OTHER PUBLICATIONS

PCT/US2024/059037—Written Opinion of the International Searching Authority (ISA), USPTO ISA/US, Jan. 31, 2025.

* cited by examiner

MEDIA SUPPLY WITH SELF-LOCKING MEDIA CORE FOR MEDIA PROCESSING DEVICES

BACKGROUND

Supplies of media for media processing devices can be provided in various arrangements. One common arrangement for a supply of media is to wrap the media about a core to form a media roll from which the media can be dispensed.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
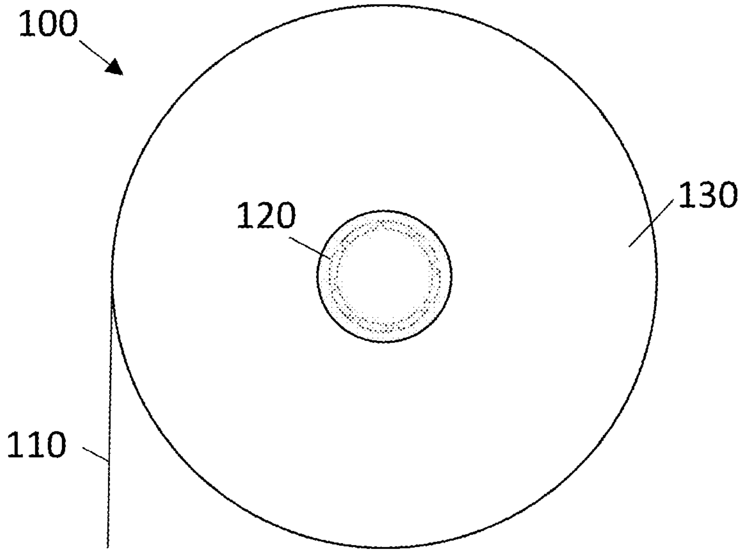
FIG. 1 illustrates an example supply of media in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Consumable supplies for media processing devices, such as media or ink ribbons, can be generally formed of or on continuous web a material that is wrapped about a core. The consumable supplies can be installed in media processing devices for use by the media processing devices. In some media processing devices, the core of a supply of media (e.g., printable and/or encodable media) in the form of a media roll is mounted on a media hanger and the media is pulled from the media roll causing the media roll to freely rotate about the media hanger. In other media processing devices, the core of the media roll or a core about which an ink ribbon is wound can be secured to a spindle such that the spindle and core generally rotate in unison. Securing the core to the spindle can have several advantages including, for example, applying tension of the web of material, preventing mitigating lateral drift and/or slippage of the web of material. As an example, typically, for media processing devices in which the core of a supply of media is secured to the spindle, the spindle can be driven and/or include a clutch to maintain a specified tension on the media as it is dispensed along a media path for processing by the media processing device. In a typical application, the spindles that receive the core include sharp blades that cut into the core of the supply of media when the core is mounted on the spindle to secure the core to the spindle. This approach can require significant force to install and remove cores and can pose a safety hazard to users installing the supply of media in the media processing device as well as to users that remove the cores from the spindle when the supply of media is depleted. Using this approach can also pose a challenge for autonomous installation of a supply of media on a spindle including blades and for autonomous removal of the core from the blades of the spindle after the supply of media is depleted.

Embodiments of the present disclosure can include a consumable supply in the form of a web of material with one or more self-locking cores which can be driven to apply tension to the web of material to lock the cores to their respective spindles of a media processing device to secure the self-locking cores to the spindles and can be driven to relieve the tension on the web of material to unlock the cores from their respective spindles to permit the cores to slide off of their respective spindles, where the spindles can be devoid of blades configured to cut into the cores. Embodiments of the continuous web of material can be a supply of media with one or more self-locking cores or can be a supply of an ink ribbon with one or more self-locking cores where the ribbon is coated, e.g., with a thermochromic ink. The self-locking core(s) of the supply can advantageously mitigate or prevent injuries commonly associated with bladed spindles while also facilitating installation and removal the cores with minimal force and/or allowing the spindles to draw or force the cores securely onto the spindles when the cores are at least partially installed on the spindles.

In one example, a continuous web of material may include media, such as, without limitation, labels. The continuous web of material can be a spool of lined or linerless media wrapped about a self-locking core. As a non-limiting example, the continuous web of media can be coated on one surface with a pressure sensitive adhesive and can include a printable surface on the opposite surface. For lined media, the media can include a release liner overlaying the adhesive that can be removed to expose the adhesive when the media is output from the media processing devices and/or when the media will be affixed to an object. For linerless media, the media is devoid of the release liner. For thermal transfer printing, the printable surface of the lined or linerless media is configured to receive a pigment (e.g., ink, resin, wax-resin, etc.) that is transferred from a ribbon supply. For direct thermal printing, a thermal printhead of the printer directly contacts the printable surface triggering a chemical and/or physical change in a thermally sensitive dye covering and/or embedded in at least a portion of the printable surface of the media. In one example, the media can be labels. The media also can include a radiofrequency identification device (RFID) and/or nearfield communication (NFC) inlay that can be written to and/or read by a RFID/NFC encoder.

Embodiments of the supply of media with the self-locking core(s) can be secured on spindle(s) of a media processing device and the supply of media can be drawn from the supply of media and routed along a media path past various media processing components (e.g., printhead(s), RFID reader/encoder, magnetic stripe reader/encoder, etc.). Processing the media from the supply of media may facilitate a continuous or batch printing and/or encoding process. As an example, a media processing device may be configured to print and/or encode media drawn from the supply of media.

The web of media can be routed along a media path from the supply of media to a print and/or encoding position located adjacent to the printhead (e.g., a thermal printhead) and/or the RFID encoder. The position of components of the media processing device relative to other components can be defined based on the flow of media along the media path from the media source to the outlet and/or a take-up spindle. For example, the media source is upstream of the printhead, the printhead is downstream of the media source (the web of media), and the outlet of the media processing device is downstream of the media source and the printhead along the media path. The continuous web of media is pulled through the media path by a driven platen roller. The printhead is generally configured to form a nip with the platen roller to pinch the media between the printhead and the platen roller. In addition to pulling the media, or in the alternative, this pinching or compressive force aids in achieving adequate print quality. Once printed and/or encoded, the printed and/or encoded portion of the media can be advanced outwardly from the printer through a media outlet by the platen roller where it can be cut and/or torn to separate the printed and/or encoded media from the media supply, can be wound on a media take-up roll for subsequent use. For media that includes a liner, the media processing device can also include a peeler downstream of the nip formed by the printhead and the platen roller. The peeler can separate the liner from the media such that the media is output from the media processing device with the adhesive of the media exposed, while the liner can be wound on the media take-up roll.

In accordance with embodiments of the present disclosure, a supply of printable media is disclosed that includes a first self-locking core, a web of printable media, and a second self-locking core. The web of printable media is wound about the first self-locking core, and the media includes a printable surface on first side, an adhesive on a second side, and liner releasably secured to the adhesive. A terminal end of the liner is secured to the second self-locking core. At least one of the first self-locking core or the second self-locking includes a cylindrical body defining a center axis and having an outer surface and an inner surface and a locking member formed along the inner surface of the body. The locking member extending radially inward towards the center axis and forming helices having a non-zero helix angle along the inner surface.

In accordance with embodiments of the present disclosure, a method of forming a supply of printable media is disclosed. The method includes winding a web of printable media about a first self-locking core. The media includes a printable surface on first side, an adhesive on a second side, and liner releasably secured to the adhesive. The method also includes securing a terminal end of the liner to a second self-locking core. At least one of the first self-locking core or the second self-locking includes a cylindrical body defining a center axis and having an outer surface and an inner surface and includes a locking member formed along the inner surface of the body. The locking member extends radially inward towards the center axis and forms a helix having a non-zero helix angle along the inner surface.

In accordance with embodiments of the present disclosure, a self-locking core for a web of material for a media processing device is disclosed. The self-locking core includes a cylindrical body and a locking member. The cylindrical body defines a center axis, has an outer surface configured to support a web of material, and has an inner surface. The locking member extends along the inner surface of the cylindrical body. The locking member extending radially inward towards the center axis and forms helix having a non-zero helix angle along the inner surface.

In accordance with embodiments of the present disclosure, a method of forming a self-locking core for a web of material for a media processing device is disclosed. The method includes forming a cylindrical body defining a center axis. The cylindrical body has an outer surface configured to support a web of material and an inner surface. The method also includes forming a locking member along the inner surface of the cylindrical body. The locking member extend radially inward towards the center axis and forms a helix having a non-zero helix angle along the inner surface.

In accordance with embodiments of the present disclosure, a supply of a thermochromic ink ribbon is disclosed. The supply of the thermochromic ink ribbon includes a first self-locking core, a web of material, and a second-self locking core. The web of material is wound about the first self-locking core. The web of material being coated with a thermochromic ink. A terminal end of the web of material is secured to the second self-locking core. At least one of the first self-locking core or the second self-locking includes a cylindrical body defining a center axis, has an outer surface, has an inner surface and includes a locking member formed along the inner surface of the body. The locking member extending radially inward towards the center axis and forms helix having a non-zero helix angle along the inner surface.

In accordance with embodiments of the present disclosure, a method of forming a supply of a thermochromic ink ribbon is disclosed. The method includes winding a web of material about a first self-locking core and securing a terminal end of the web of material to a second self-locking core. The web of material being coated with a thermochromic ink. At least one of the first self-locking core or the second self-locking includes a cylindrical body defining a center axis. The cylindrical body has an outer surface and an inner surface and a locking member is formed along the inner surface of the body. The locking member extends radially inward towards the center axis and forms a helix along the inner surface having a non-zero helix angle.

In accordance with embodiments of the present disclosure, a supply of printable media is disclosed. The supply of printable material includes a self-locking core and a web of printable media wound about the self-locking core. The media includes a printable surface on a first side and an adhesive on a second side. The self-locking includes a cylindrical body defining a center axis. The cylindrical body has an outer surface and an inner surface and a locking member formed along the inner surface of the body. The locking member extends radially inward towards the center axis and forms a helix having a non-zero helix angle along the inner surface.

In accordance with embodiments of the present disclosure, a method of forming a supply of printable media is disclosed. The method includes winding a web of printable media about a self-locking core. The media includes a printable surface on first side and an adhesive on a second side. The self-locking includes a cylindrical body defining a center axis. The cylindrical body has an outer surface and an inner surface and a locking member formed along the inner surface of the body. The locking member extends radially inward towards the center axis and forms a helix having a non-zero helix angle along the inner surface.

In accordance with embodiments of the present disclosure, which may be used in combination with any other aspect or combination of embodiments listed herein, the locking member is discontinuous between a first end of the locking member and a second end of the locking member.

In accordance with embodiments of the present disclosure, which may be used in combination with any other aspect or combination of embodiments listed herein, the locking member is continuous between a first end of the locking member and a second end of the locking member.

In accordance with embodiments of the present disclosure, which may be used in combination with any other aspect or combination of embodiments listed herein, the locking member extends along the inner surface from a first end of the cylindrical body to a second end of the cylindrical body.

In accordance with embodiments of the present disclosure, which may be used in combination with any other aspect or combination of embodiments listed herein, a length of the locking member is greater than a length of the cylindrical body.

In accordance with embodiments of the present disclosure, which may be used in combination with any other aspect or combination of embodiments listed herein, a first end of the locking member is flush with or offset inwardly from a first end of the cylindrical body and a second end of the locking member is flush with or offset inwardly from a second end of the cylindrical body.

In accordance with embodiments of the present disclosure, which may be used in combination with any other aspect or combination of embodiments listed herein, the helix angle is greater than ten (10) degrees and less than eighty (80) degrees.

In accordance with embodiments of the present disclosure, which may be used in combination with any other aspect or combination of embodiments listed herein, a pitch of the locking member is between five (5) degrees and seventy (70) degrees.

In accordance with embodiments of the present disclosure, which may be used in combination with any other aspect or combination of embodiments listed herein, a number of turns of the locking member is between twenty-five thousandths (0.025) and three (3).

In accordance with embodiments of the present disclosure, which may be used in combination with any other aspect or combination of embodiments listed herein, a second end of the locking member is circumferentially offset relative to a first end of the locking member by between eight hundredths (0.08) radians and nineteen (19) radians.

In accordance with embodiments of the present disclosure, which may be used in combination with any other aspect or combination of embodiments listed herein, the locking member forms a rib along the inner surface of the cylindrical body and extends radially inward from the inner surface by between one half (0.5) millimeters and four (4) millimeters.

In accordance with embodiments of the present disclosure, which may be used in combination with any other aspect or combination of embodiments listed herein, the locking member is one of a plurality of locking members formed along the inner surface, and each of the plurality of locking members has the non-zero helix angle.

FIG. 1 is an example supply 100 of media 110. The media 110 can be wound about a self-locking core 120 to form a media roll 130. The self-locking core 120 can be configured to facilitate securing or locking the self-locking core 120 to a media spindle of a media processing device, where the media spindle can be devoid of blades that cut into the self-locking core 120. The media processing device can apply tension to the media 110 along a media path to secure or lock the self-locking core 120 to the media spindle (e.g., the self-locking core is in a locked state relative to the spindle) as described herein. When the tension in the media 110 is released by the media processing device, the self-locking core 120 is in an unsecured or unlocked state relative to the media spindle to allow the self-locking cores to slide off of the media spindle, e.g., with minimal force and/or due to gravity in some environments.

Figure 2:
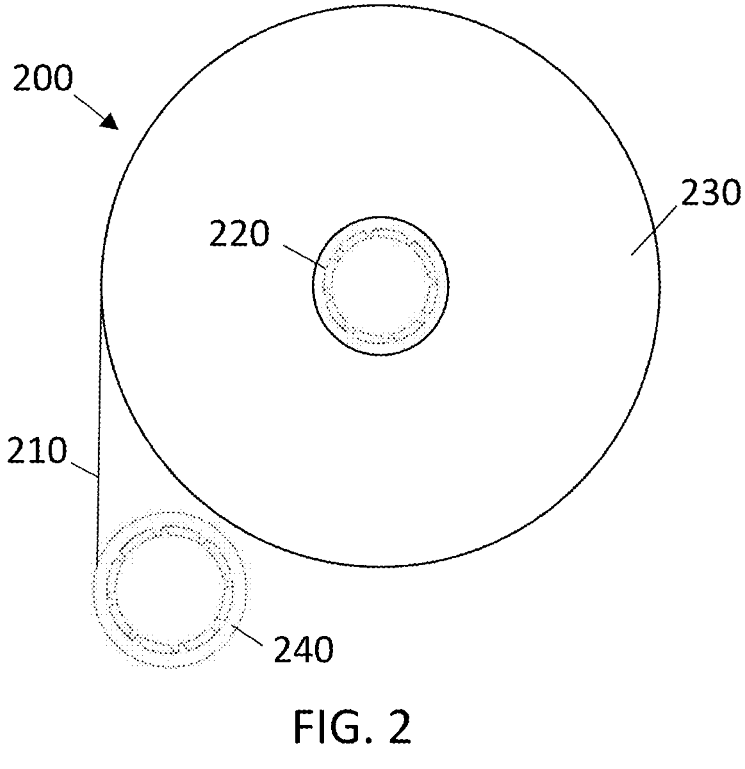
FIG. 2 illustrates another example supply of media in accordance with embodiments of the present disclosure.

FIG. 2 is an example supply 200 of media 210. The media 210 can be wound about a self-locking core 220 to form a media roll 230. A terminal end of the media 210 (or a liner of the media 210) can be attached to a self-locking core 240. The self-locking cores 220 and 240 can be configured to facilitate securing the self-locking cores 220 and 240 to respective media spindles of a media processing device, where the media spindles can be devoid of blades that cut into the self-locking cores 220 and 240. The media processing device can apply tension to the media 210 along a media path to secure or lock the self-locking cores 220, and 240 to the media spindles (e.g., the cores 220 and 240 are in a locked state relative to their respective spindles) as described herein. When the tension in the media 210 is released by the media processing devices, the self-locking cores 120, 220, and/or 240 are unsecure or unlocked relative to the media spindles to allow the self-locking cores to slide off of the media spindles, e.g., with minimal force and/or due to gravity in some environments.

Figure 3:
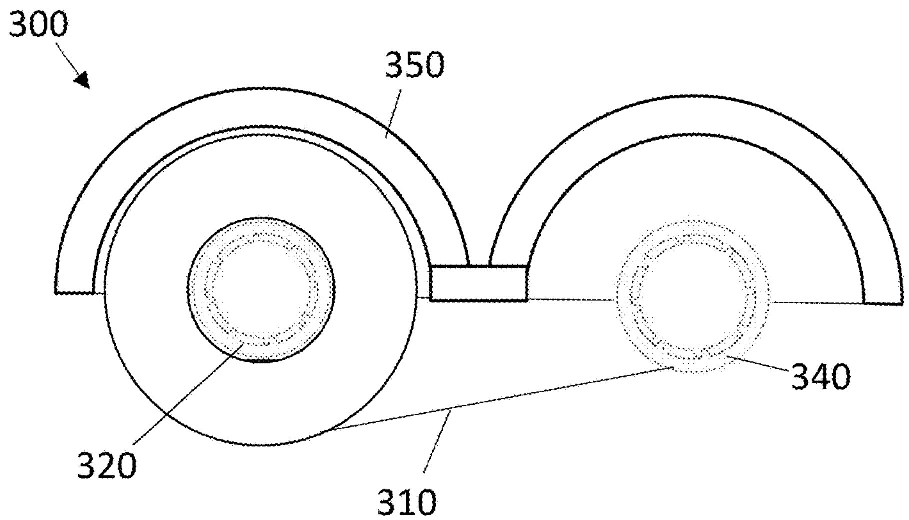
FIG. 3 illustrates an example supply of an ink ribbon in accordance with embodiments of the present disclosure.
Figure 4:
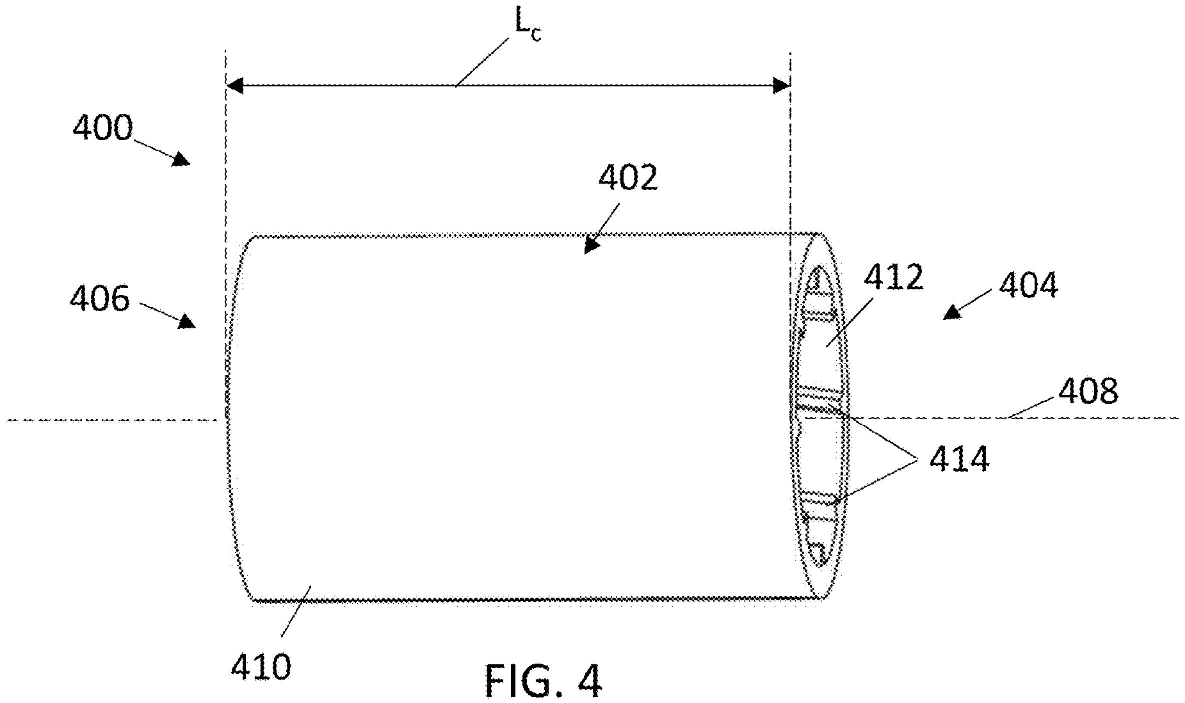
FIG. 4 illustrates a side view of an example core for a media supply in accordance with embodiments of the present disclosure.

FIG. 3 is an example supply 300 of an ink ribbon 310. The ink ribbon 310 can be wound about a self-locking core 320. A terminal end of the ink ribbon 310 can be attached to a self-locking core 340. In one example the supply 300 of the ink ribbon 310 including the self-locking cores 320 and 340 can be part of a ribbon cartridge 350 configured to align the cores 320 and 340 of the supply 300 with ribbon spindles The self-locking cores 320 and 340 can be configured to facilitate securing the self-locking cores 320 and 340 to respective ribbon spindles of a media processing device, where the ribbon spindles can be devoid of blades that cut into the self-locking cores 320 and 340. The media processing device can apply tension to the in ribbon 310 along a ribbon path to secure or lock the self-locking cores 320, and 340 to the ribbon spindles (e.g., the cores 320 and 340 are in a locked state relative to their respective ribbon spindles) as described herein. When the tension in the ink ribbon 310 is released by the media processing device, the self-locking cores 320 and 340 are unsecure or unlocked relative to the spindles (e.g., in an unlocked state) to allow the self-locking cores to slide off of the ribbon spindles, e.g., with minimal force and/or due to gravity in some environments.

As indicated herein, FIGS. 1-3 are provided as example consumable supplies for a media processing device that include a continuous web or material with self-locking core(s). Other examples may differ from what is described with regard to FIGS. 1-3. The number and arrangement of devices/components shown in FIGS. 1-3 are provided as an example. In practice, there may be additional devices/components, fewer devices/components, different devices/components, or differently arranged devices/components than those shown in FIGS. 1-3. Furthermore, two or more devices/components shown in FIGS. 1-3 may be implemented within a single device/component, or a single device/component shown in FIGS. 1-3 may be implemented as multiple, distributed devices/components. Additionally, or alternatively, a set of devices/components (e.g., one or more devices/components) shown in FIGS. 1-3 may perform one or more functions described as being performed by another set of devices/components shown in FIGS. 1-3.

Figure 6:
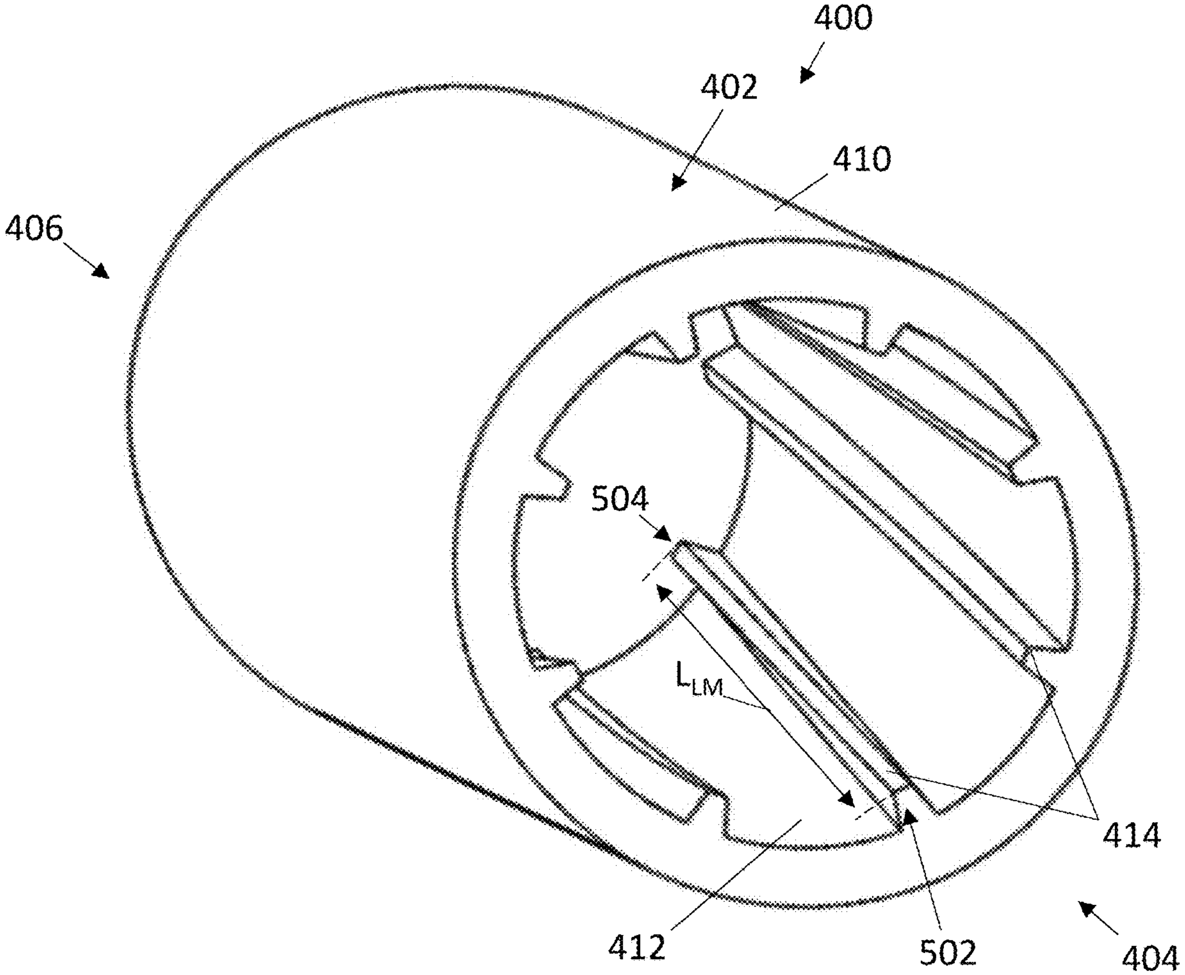
FIG. 6 illustrates a perspective view of the example core of FIG. 3 in accordance with embodiments of the present disclosure.
Figure 7:
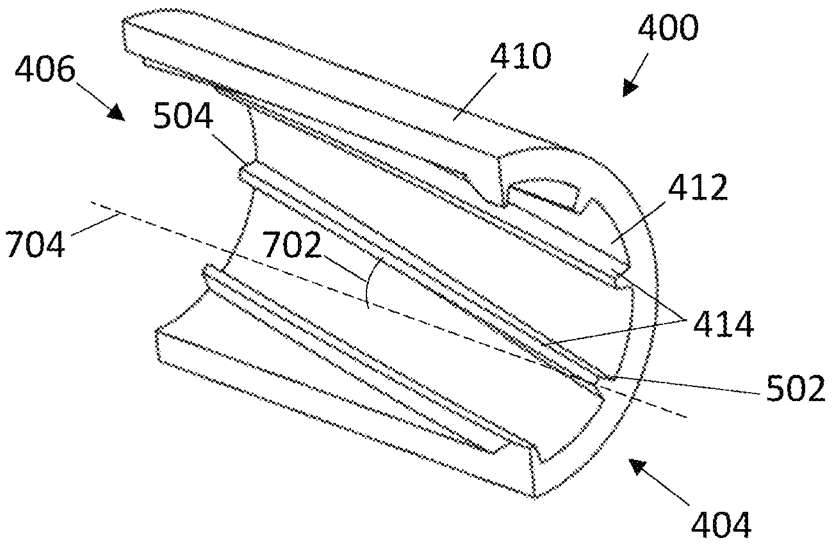
FIG. 7 illustrates a perspective cross sectional view of the example core along line A-A in FIG. 4 in accordance with embodiments of the present disclosure.
Figure 8:
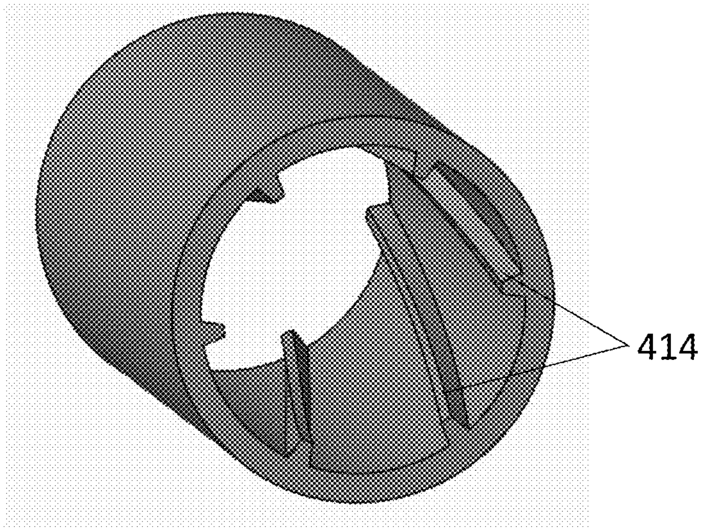
FIG. 8 illustrates another example core in accordance with embodiments of the present disclosure.
Figure 9:
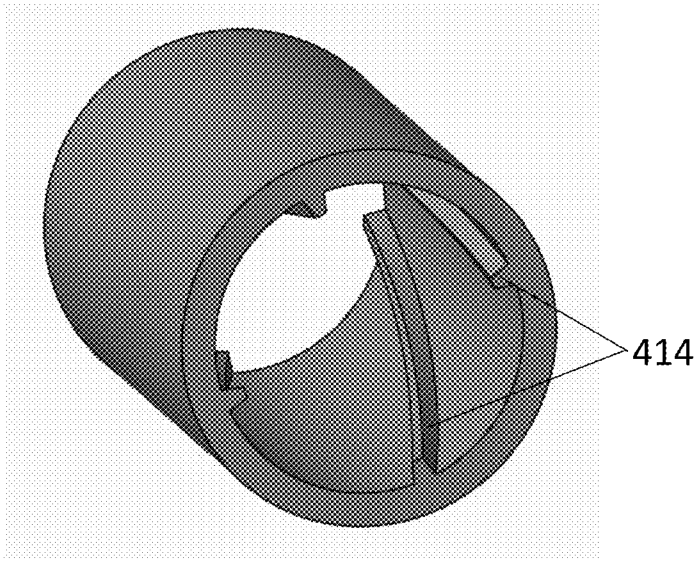
FIG. 9 illustrates another example core in accordance with embodiments of the present disclosure.
Figure 10:
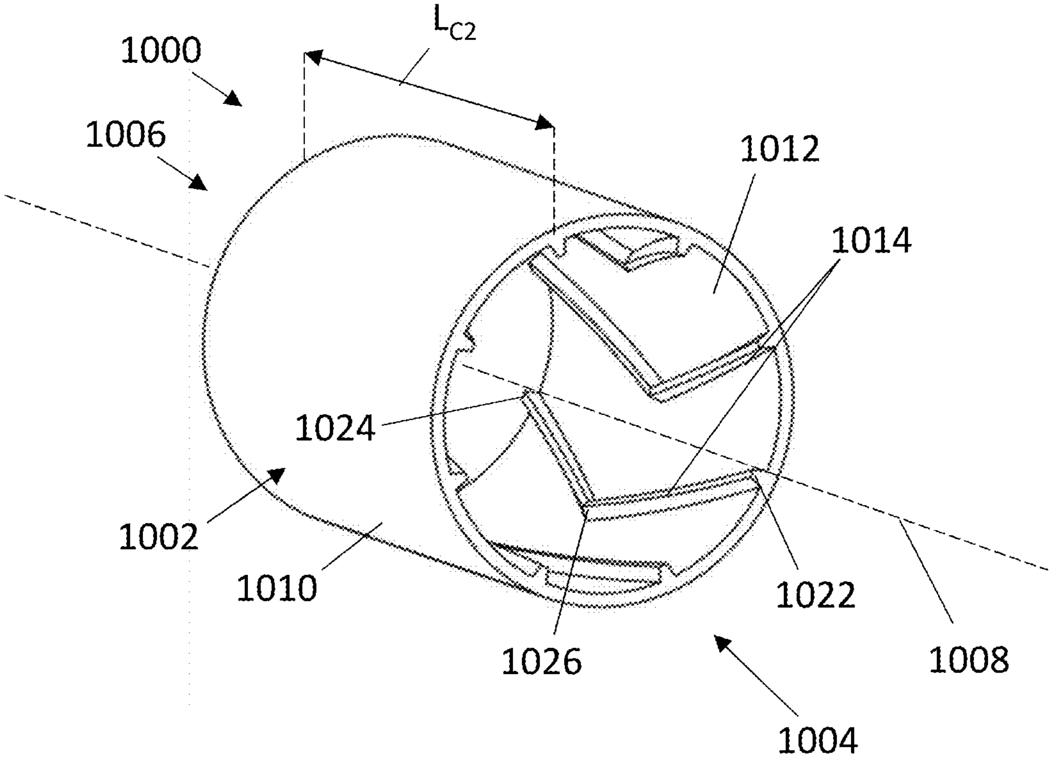
FIG. 10 illustrates a perspective view of another example core in accordance with embodiments of the present disclosure.

FIGS. 4-7 illustrate an example self-locking core 400 in accordance with embodiments of the present disclosure. The self-locking cores 120, 220, 240, 320, and/or 340 of FIGS. 1-3 can be embodied as the self-locking core 400. The self-locking core includes a cylindrical body 402 having a first base or end 404 and a second base or end 406. The cylindrical body 402 defines a center axis 408 and a length $L_c$ measured parallel to the center axis 408 from the first end 404 to the second end 406. The length Lc can be specified or otherwise correspond to width of the web of material to be wound about the body 402. As one example, the length $L_c$ can be between approximately one quarter of an inch and eight inches. As another example, the length $L_c$ can be between approximately two inches and four inches. As another example, the length $L_c$ can be one quarter of an inch, one half of an inch, three quarters of an inch, one inch, two inches, three inches, four inches, five inches, six inches, seven inches, or eight inches. The body 402 can have an outer surface 410 and an inner surface 412, where the inner surface 412 can include one or more locking members 414. In the present embodiment, the core 400 is illustrated as including eight locking members 414, although the self-locking core 400 can include more or fewer locking members. For example, FIG. 8 illustrates an embodiment of the self-locking core that includes six locking members 414, while FIG. 9 illustrates an embodiment of the self-locking core that includes four locking members 414.

Figure 5:
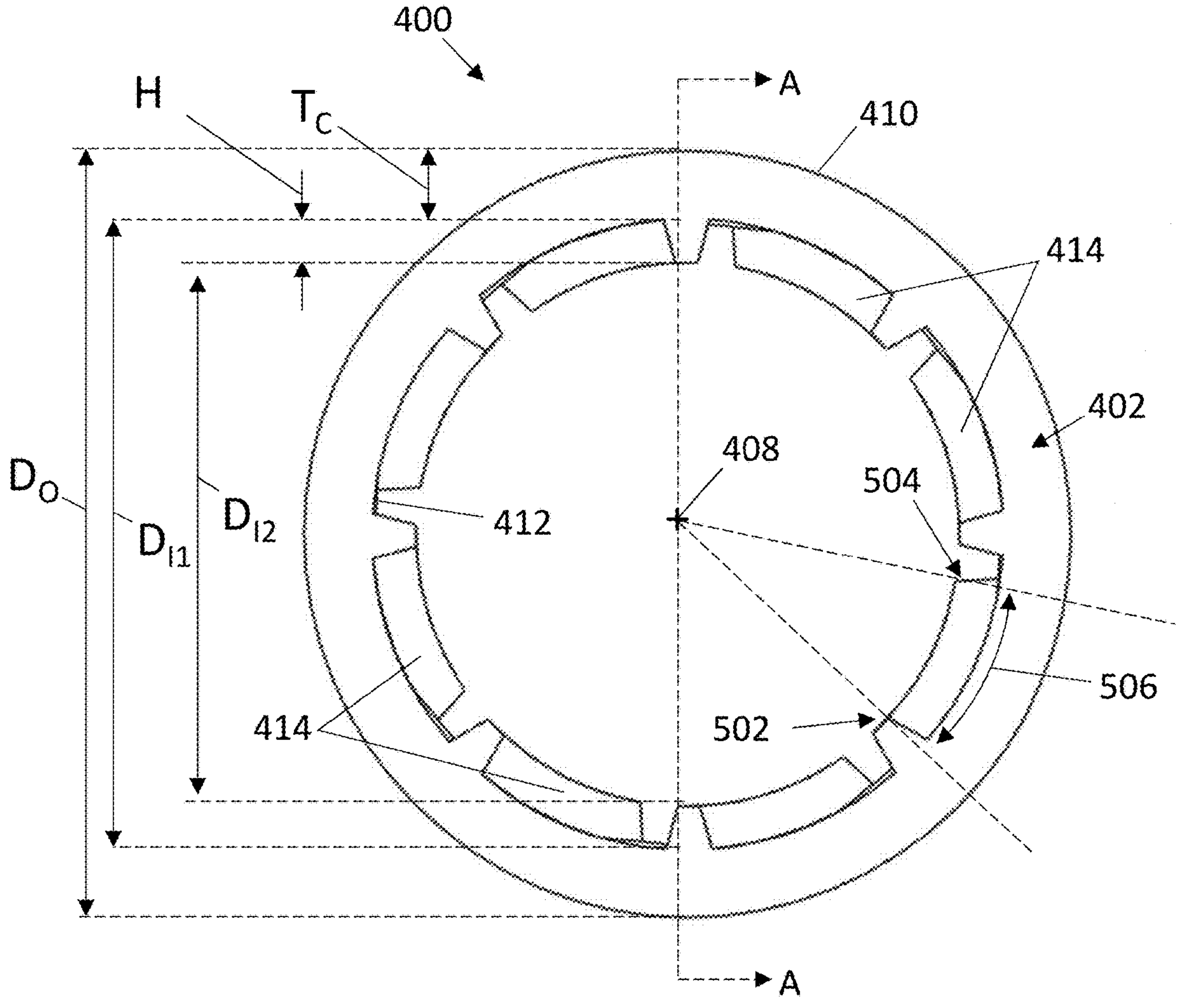
FIG. 5 illustrates an end view of the example core of FIG. 3 in accordance with embodiments of the present disclosure.

As shown in FIG. 5, the body 402 of the core 400 can define an outer diameter $D_O$ measured perpendicular to the center axis 408 between two diametrically opposed points on the outer surface 410 of the body 402, can define a first inner diameter $D_{I1}$ measured perpendicular to the center axis 408 between two diametrically opposed points on the inner surface 412 of the body 402, and can define a second inner diameter $D_{I2}$ measured perpendicular to the center axis 408 between two diametrically opposed points between the locking members 414. The outer diameter $D_O$ is greater than the inner diameters $D_{I1}$ and $D_{I2}$ and the inner diameter $D_{I2}$ is less than the inner diameter $D_{I1}$. A thickness $T_c$ of the body can be measured radially relative to the center axis between inner surface 412 and the outer surface 410 and can be the difference between the outer diameter $D_o$ and the inner diameter $D_{I1}$. The locking members 414 can be formed as ribs that project radially inwardly a specified distance H from the inner surface 412 generally towards the center axis 408. The distance H can correspond to a difference between the inner diameter $D_{I2}$ and the inner diameter $D_{I1}$. In one example, the distance H can be between one half (0.5) millimeters and approximately four (4) millimeters or between approximately one and one half (1.5) millimeters and two and one half (2.5) millimeters. With reference to FIGS. 5 and 6, the locking members 414 can have a length $L_{LM}$ measured along the locking members 414 from a first terminal end 502 of the locking members 414 to a second terminal end 504 of the locking members 414. In the present example, in addition to first and second ends 502 and 504 being spaced away from each by the length $L_{LM}$ of the locking members the second terminal end 504 can be offset circumferentially on the inner surface relative to the first terminal end 502 by an arc length 506, a specified non-zero number of radians, and/or a specified non-zero angle relative to the center axis 408. In one example, the number of radians can be approximately eight hundredths (0.08) radians and approximately nineteen (19) radians. In the present example, the locking members 414 can define helices along the inner surface 412. The helices can right-handed and/or left-handed helices having helix angles 702 measured between the locking members 414 and an axial line 704 in the inner surface that is parallel to the center axis 408 and that extends at a fixed angle along its length relative to the center axis 408, as shown in FIG. 7. The helix angle can be greater than zero (0) degrees and less than ninety (90) degrees, between approximate ten (10) degrees and approximately eighty (80) degrees, between approximately twenty (20) degrees and approximately seventy (70) degrees, or between approximately twenty-five (25) degrees and approximately sixty-five (65) degrees. In one example, the helix angle is between approximately thirty (30) and approximately (40) degrees. The locking members 414 can also have a specified pitch and a specified number of turns. As one example, the locking members 414 can have a pitch between approximately five (5) degrees to approximately seventy (70) or approximately ten (10) degrees and approximately thirty (30) degrees and/or can have a specified number of turns of approximately twenty-five thousandths (0.025) to approximately three (3) or between approximately two tenths (0.2) and two (2).

In one example, the first end 502 of the locking members 414 can coincide and be flush with the first end 404 of the body 402 and/or the second end 504 can coincide and be flush with the second end 406 of the body 402 such that the locking members 414 extend from the first end 404 to the second end 406. For embodiments in which the locking members 414 extend from the first end 404 to the second end 406, the length $L_{FC}$ of the locking members 414 can be greater than the length $L_C$ of the body 402.

In one example, the first end 502 of the locking members 414 can be offset inwardly from the first end 404 of the body 402 and/or the second end 504 can be offset inwardly from the second end 406 of the body 402 such that at least one the ends 502 or 504 of the locking members 414 terminate before reaching the first end 404 to the second end 406. As an example, both the first end 502 and the second end 504 of the locking members 414 can be offset inwardly from the first end 404 and the second end 406 of the body 402, the first end 502 of the locking members 414 can coincide and be flush with the first end 404 of the body 402 and the second end 504 can be offset inwardly from the second end 406 of the body 402 such that the second end 504 of the locking members 414 terminate before reaching the second end 406, or the second end 504 of the locking members 414 can coincide and be flush with the second end 504 of the body 402 and the first end 502 can be offset inwardly from the first end 404 of the body 402 such that the first end 502 of the locking members 414 terminate before reaching the first end 404.

In one example, the first end 502 of the locking members 414 can extend beyond the first end 404 of the body 402 and/or the second end 504 can extend beyond the second end 406 of the body 402 such that the locking members 414 extend from the first end 404 to the second end 406.

Figure 14A:
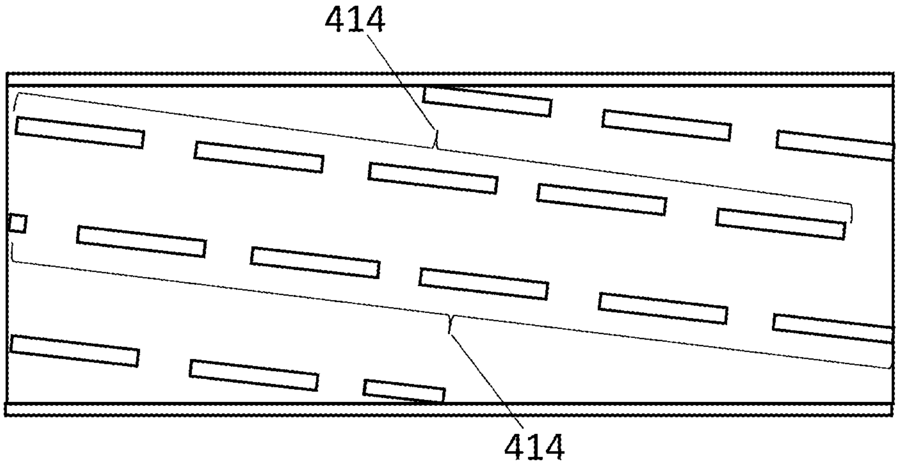
FIG. 14A illustrates a cross sectional that depicts an example variation of locking members of a self-locking core in accordance with embodiments of the present disclosure.

In one example, the locking members 414 can be continuous between the first end 502 and the second end 504 as shown in FIGS. 4-9 or discontinuous between the first end 502 and the second end 504 as shown in FIG. 14A.

FIGS. 10-13 illustrate an example self-locking core 1000 in accordance with embodiments of the present disclosure. The self-locking cores 120, 220, 240, 320, and/or 340 can be embodied as the self-locking core 1000. The self-locking core 1000 includes a cylindrical body 1002 having a first base or end 1004 and a second base or end 1006. The cylindrical body 1002 defines a center axis 1008 and a length $L_{c2}$ measured parallel to the center axis 1008 from the first end 1004 to the second end 1006. The length $L_{c2}$ can be specified or otherwise correspond to width of the web of material to be wound about the body 1002. As one example, the length $L_{c2}$ can be between approximately one quarter of an inch and eight inches. As another example, the length $L_{c2}$ can be between approximately two inches and four inches. As another example, the length $L_{c2}$ can be one quarter of an inch, one half of an inch, three quarters of an inch, one inch, two inches, three inches, four inches, five inches, six inches, seven inches, or eight inches. The body 1002 can have an outer surface 1010 and an inner surface 1012, where the inner surface 1012 can include one or more locking members 1014 or two or more locking members 1014. In the present example, the locking members 414 can define helices along the inner surface 412. The helices can be right-handed and/or left-handed helices having helix angles. In the present embodiment, the core 1000 is illustrated as including eight locking members 1014, although the self-locking core 1000 can include more or fewer locking members.

Figure 11:
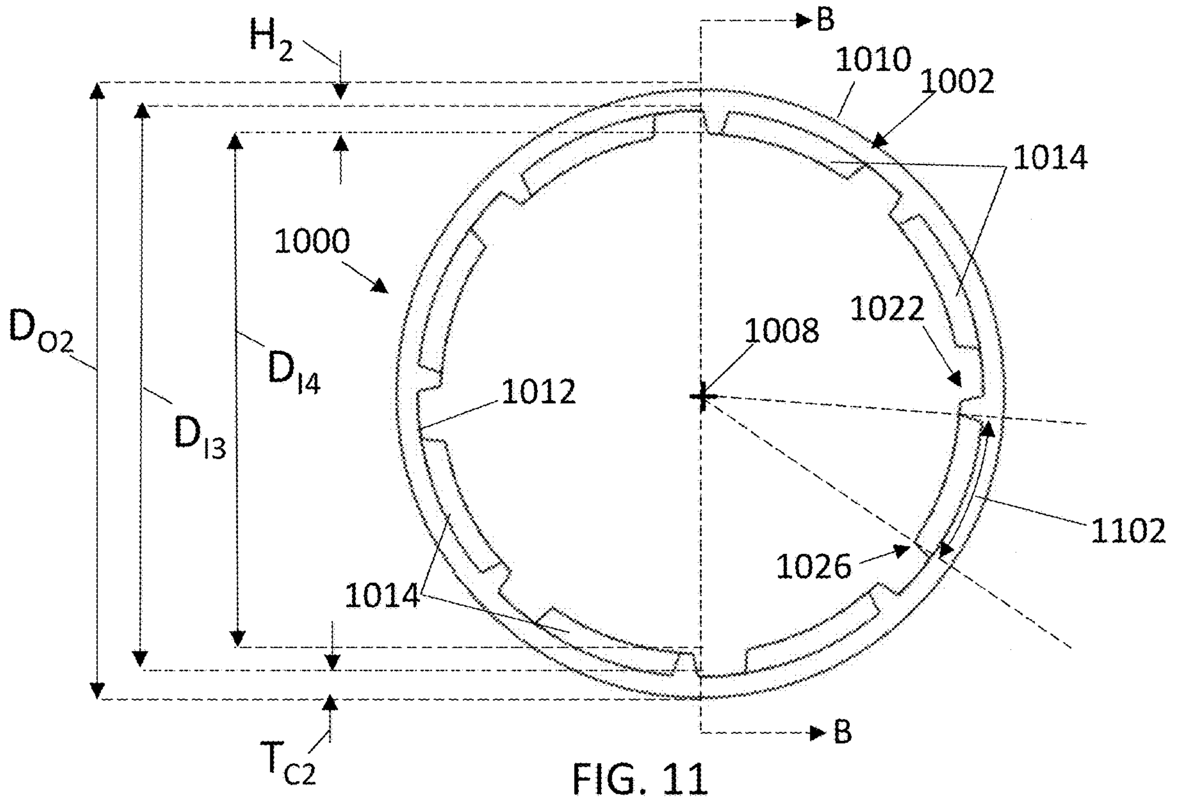
FIG. 11 illustrates an end view of the example core of FIG. 9 in accordance with embodiments of the present disclosure.
Figure 12:
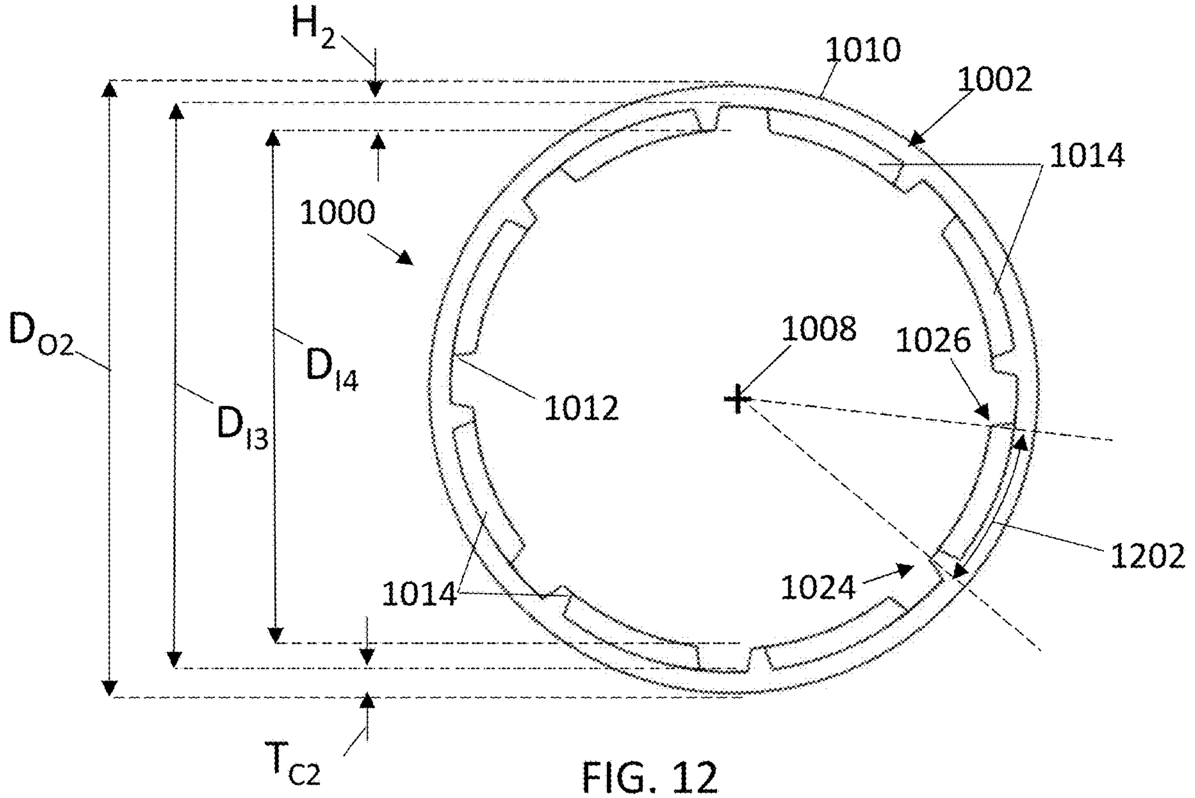
FIG. 12 illustrates another end view of the example core of FIG. 9 in accordance with embodiments of the present disclosure.

As shown in FIGS. 11-12, the body 1002 of the core 1000 can define an outer diameter $D_{o2}$ measured perpendicular to the center axis 1008 between two diametrically opposed points on the outer surface 1010 of the body 1002, can define an inner diameter $D_{I3}$ measured perpendicular to the center axis 1008 between two diametrically opposed points on the inner surface 1010 of the body 1002, and can define an inner diameter $D_{I4}$ measured perpendicular to the center axis 1108 between two diametrically opposed points between the locking members 1014. The outer diameter $D_{o2}$ is greater than the inner diameters $D_{I3}$ and $D_{I4}$ and the inner diameter $D_{I4}$ is less than the inner diameter $D_{I3}$. A thickness $T_{c2}$ of the body can be measured radially relative to the center axis 1008 between inner surface 1012 and the outer surface 1010 and can be the difference between the outer diameter $D_{o2}$ and the inner diameter $D_{I2}$. The locking members 1014 can form ribs that project radially inwardly a specified distance $H_2$ from the inner surface 1012 generally towards the center axis 1008. The distance $H_2$ can correspond to a difference between the inner diameter $D_{I4}$ and the inner diameter $D_{I3}$. In one example, the distance $H_2$ can be between approximately one half (0.5) millimeters and four (millimeters). With reference to FIGS. 10-14, the locking members 1014 can have a length $L_{LM2}$ measured along the locking members 1014 from a first terminal end 1022 of the locking members 1014 to a second terminal end 1024 of the locking members 1014. In one example, in addition to first and second ends 1022 and 1024 being spaced away from each by the length $L_{LM2}$ of the locking members, the second terminal end 1024 can be circumferentially aligned on the inner surface 1012 relative to the first terminal end 1022 along an axial line such that first and second ends 1022 and 1024 are the locking members are oriented at the same angle relative to the center axis 1008. In one example, the second terminal end 1024 can be offset circumferentially on the inner surface 1012 relative to the first terminal end 1022 by an arc length, a specified non-zero number of radians, and/or a specified non-zero angle relative to the center axis 1008. In one example, a second end 1024 of the locking member can be circumferentially offset relative to a first end 1022 of the locking member by between approximately eight hundredths (0.08) radians and approximately nineteen (19) radians.

Figure 13:
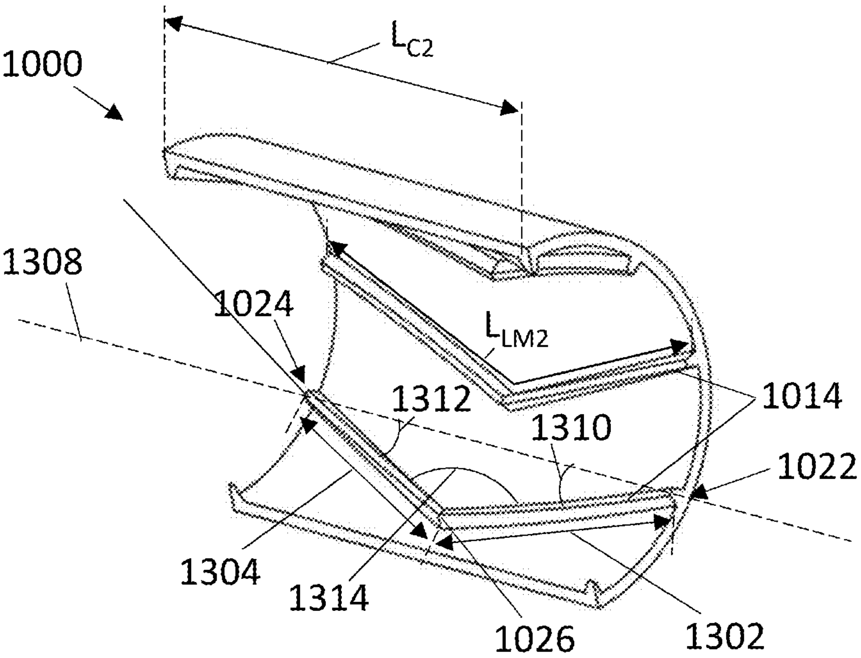
FIG. 13 illustrates a perspective cross sectional view of the example core along line B-B in FIG. 11 in accordance with embodiments of the present disclosure.

In the present example, referring to FIG. 13, the locking members 1014 can have a first section 1302 with a first length extending along the inner surface 1012 from the first end 1022 to an intermediate point 1026 along the locking members 1014 and can have a second section 1304 with a second length extending along the inner surface 1012 from the second end 1024 to the intermediate point 1026 along the locking members 1014. The length $L_{LM2}$ of the locking members 1014 can be the sum of the lengths of the first and second sections 1302 and 1304. The intermediate point 1026 can be a vertex of the locking members 1014. As an example, the first section 1302 can extend from the first end 1022 to the intermediate point 1026 at a first helix angle 1310 relative to an axial line 1308 that extends along the inner surface 1012 parallel to the center axis 1008 at a fixed angle relative to the center axis 1008 and the second section 1304 can extend from the second end 1024 to the intermedia point 1026 at a second helix angle 1312 relative to the axial line 1308. The first and second angles 1310 and 1312 are non-zero angles and can be equal to each other or can be different from each other. In one example, the first and second helix angles 1310 and 1312 can be greater than zero (0) degrees and less than ninety (90) degrees, between approximate ten (10) degrees and approximately eighty (80) degrees, between approximately twenty (20) degrees and approximately seventy (70) degrees, or between approximately twenty-five (25) degrees and approximately sixty-five (65) degrees. In one example, the helix angle is between approximately thirty (30) and approximately (40) degrees. The first and second sections 1302 and 1304 can also have a specified pitch and a specified number of turns. As one example, the sections 1302 and 1304 can have a pitch between approximately five (5) degrees to approximately seventy (70) or approximately ten (10) degrees and approximately thirty (30) degrees and/or can have a specified number of turns of approximately twenty-five thousandths (0.025) to approximately three (3) or between approximately two tenths (0.2) and two (2). For embodiments in which the first and second ends 1022 and 1024 are circumferentially aligned with each other, the axial line 1308 can intersect the first and second ends 1022 and 1024.

In one example, the first section and the second section 1302 and 1304 can form an inner angle 1314 at the intermediate point 1026. In one example, the inner angle 1314 is greater than zero and less than one hundred eight degrees or is greater than forty-five degrees and less than one hundred eighty degrees. In one example, the *intermedia* point 1026 can be disposed at a midpoint of the length $L_{C2}$ of the body 1002 and/or at a midpoint of the length $L_{LM2}$ of the locking members 1014. In other examples, the intermediate point 1026 can be offset from a midpoint of the length $L_{C2}$ of the body 1002 and/or at a midpoint of the length $L_{LM2}$ of the locking members 1014. In the present example, in addition to first end 1022 and intermediate point 1026 being spaced away from each other, as shown in FIG. 11, the intermediate point 1026 can be offset circumferentially on the inner surface 1012 relative to the first end 1022 by an arc length 1102, a specified non-zero number of radians, and/or a specified non-zero angle relative to the center axis 1008. In one example, the Number of radians can be between approximately eight hundredths (0.08) radians and nineteen (19) radians. Likewise, in the present example, in addition to second end 1024 and the intermediate point 1026 being spaced away from each other, as shown in FIG. 12, the intermediate point 1026 can be offset circumferentially on the inner surface 1012 relative to the second end 1024 by an arc length 1202, a specified non-zero number of radians, and/or a specified non-zero angle relative to the center axis 1008. In one example, the number of radians can be between approximately eight hundredths (0.08) radians and nineteen (19) radians.

Figure 14B:
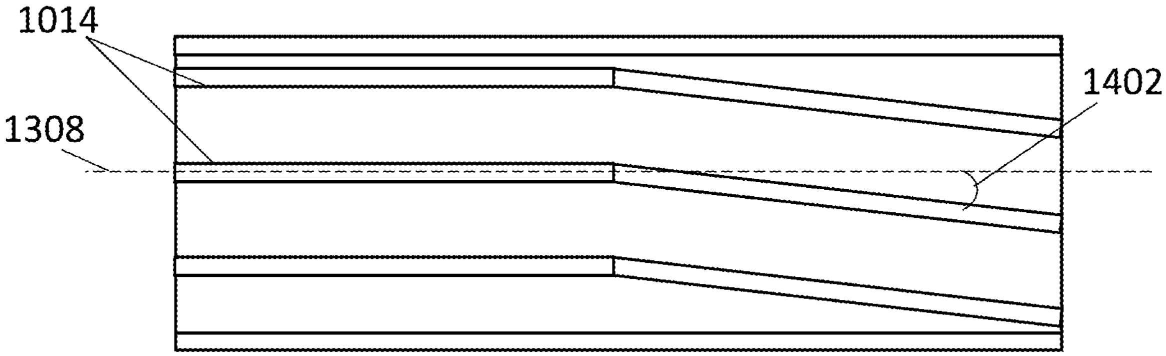
FIG. 14B illustrates a cross sectional that depicts an example variation of locking members of a self-locking core in accordance with embodiments of the present disclosure.

In one example, the second section 1304 of the locking member 1014 can extend from the second end 1024 to the intermedia point 1026 parallel to the axial line 1308 and at a fixed angle relative to the center axis 1008 (the second angle 1312 is zero) and the first section 1302 of the locking member 1014 can extend from the intermediate point 1026 to the first end 1022 at a nonzero angle 1402 relative to the axial line 1308 as shown in FIG. 14B.

In one example, the first end 1022 of the locking members 1014 can coincide and be flush with the first end 1004 of the body 1002 and/or the second end 1024 can coincide and be flush with the second end 1006 of the body 1002 such that the locking members 1014 extend from the first end 1004 to the second end 1006.

In one example, the first end 1022 of the locking members 1014 can be offset inwardly from the first end 1004 of the body 1002 and/or the second end 1024 can be offset inwardly from the second end 1006 of the body 1002 such that at least one the ends 1022 or 1024 of the locking members 1014 terminate before reaching the first end 1004 to the second end 1006. As an example, both the first end 1022 and the second end 1024 of the locking members 1014 can be offset inwardly from the first end 1004 and the second end 1006 of the body 1002, the first end 1022 of the locking members 1014 can coincide and be flush with the first end 1004 of the body 1002 and the second end 1024 can be offset inwardly from the second end 1006 of the body 1002 such that the second end 1024 of the locking members 1014 terminate before reaching the second end 1006, or the second end 1024 of the locking members 1014 can coincide and be flush with the second end 1006 of the body 1002 and the first end 1022 can be offset inwardly from the first end 1004 of the body 1002 such that the first end 1022 of the locking members 1014 terminate before reaching the first end 1004.

In one example, the first end 1022 of the locking members 1014 can extend beyond the first end 1004 of the body 1002 and/or the second end 1024 can extend beyond the second end 1006 of the body 1002 such that the locking members 1014 extend from the first end 1004 to the second end 1006.

In one example, the locking members 1014 can be continuous or discontinuous between the first end 1022 and the second end 1024.

In one example, the length $L_{LM2}$ of the locking members 1014 can be greater than the length $L_{C2}$ of the body 1002.

Figure 15:
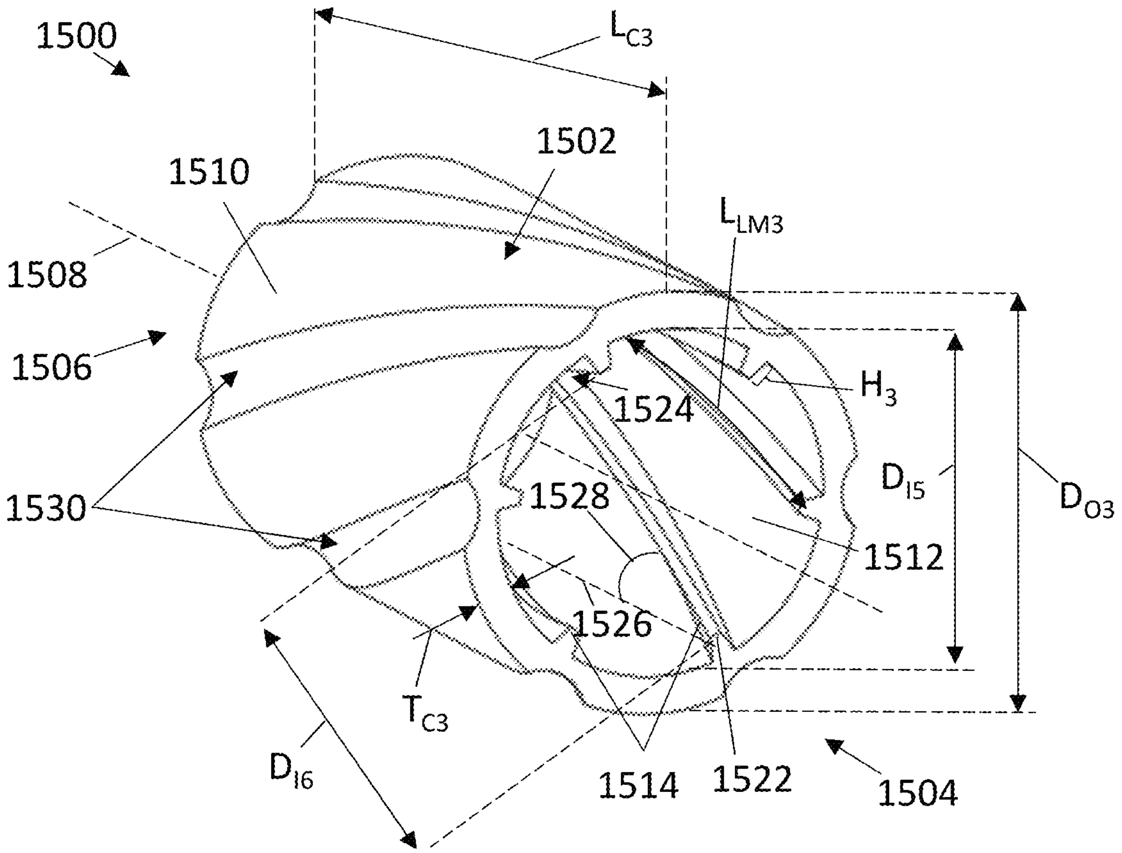
FIG. 15 illustrates a perspective view of another example core in accordance with embodiments of the present disclosure.

FIG. 15 illustrates an example self-locking core 1500 in accordance with embodiments of the present disclosure. The self-locking cores 120, 220, 240, 320, and/or 340 of FIGS. 1-3 can be embodied as the self-locking core 1500. The self-locking core 1500 includes a cylindrical body 1502 having a first base or end 1504 and a second base or end 1506. The cylindrical body 1502 defines a center axis 1508 and a length $L_c$ measured parallel to the center axis 1508 from the first end 1504 to the second end 1506. The length Lc can be specified or otherwise correspond to width of the web of material to be wound about the body 1502. As one example, the length $L_{C3}$ can be between approximately one quarter of an inch and eight inches. As another example, the length $L_{C3}$ can be between approximately two inches and four inches. As another example, the length $L_{C3}$ can be one quarter of an inch, one half of an inch, three quarters of an inch, one inch, two inches, three inches, four inches, five inches, six inches, seven inches, or eight inches. The body 1502 can have an outer surface 1510 and an inner surface 1512, where the inner surface 1512 can include one or more locking members 1514. In the present embodiment, the core 1500 is illustrated as including eight locking members 1514, although the self-locking core 1500 can include more or fewer locking members.

As shown in FIG. 15, a thickness $T_{C3}$ of the body can be measured radially relative to the center axis between inner surface 1512 and the outer surface 1510. The locking members 1514 can be formed by contours in the outer and inner surfaces 1510 and 1512 that project radially inwardly a specified distance $H_3$ generally towards the center axis 1508 causing the outer surface 1510 to have groves 1530 forming helices that correspond to a location of the locking members 1514, which can be formed as ribs along the inner surface 1512. The body 1502 of the core 1500 can define an outer diameter $D_{O3}$ measured perpendicular to the center axis 1508 between two diametrically opposed points on the outer surface 1510 of the body 1502, can define a first inner diameter $D_{I5}$ measured perpendicular to the center axis 1508 between two diametrically opposed points on the inner surface 1512 of the body 1502, and can define a second inner diameter $D_{I6}$ measured perpendicular to the center axis 1508 between two diametrically opposed points between the locking members 1514. The outer diameter $D_{O3}$ is greater than the inner diameters $D_{I5}$ and $D_{I6}$ and the inner diameter $D_{I6}$ is less than the inner diameter $D_{I5}$.

In one example, the locking members 1514 can extend inwardly a distance $H_3$ between approximately one half (0.5) millimeters and approximately four (4) millimeters or between approximately one and one half (1.5) millimeters and two and one half (2.5) millimeters. The locking members 1514 can have the length $L_{LM3}$ measured along the locking members 1514 from a first terminal end 1522 of the locking members 1514 to a second terminal end 1524 of the locking members 1514. In the present example, in addition to first and second ends 1522 and 1524 being spaced away from each by the length $L_{LM3}$ of the locking members 1514 the second terminal end 1524 can be offset circumferentially on the inner surface relative to the first terminal end 1522 by an arc length, a specified non-zero number of radians, and/or a specified non-zero angle relative to the center axis 1508. In one example, the number of radians can be approximately eight hundredths (0.08) radians and approximately nineteen (19) radians. In the present example, the locking members 1514 can define helices along the inner surface 1512. The helices can have right-handed and/or left-handed helix angles 1528 measured between the locking members 1514 and an axial line 1526 in the inner surface 1512 that is parallel to the center axis 1508 and that extends at a fixed angle along its length relative to the center axis 1508. The helix angle 1528 can be greater than zero (0) degrees and less than ninety (90) degrees, between approximate ten (10) degrees and approximately eighty (80) degrees, between approximately twenty (20) degrees and approximately seventy (70) degrees, or between approximately twenty-five (25) degrees and approximately sixty-five (65) degrees. In one example, the helix angle is between approximately thirty (30) and approximately (40) degrees. The locking members 1514 can also have a specified pitch and a specified number of turns. As one example, the locking members 1514 can have a pitch between approximately five (5) degrees to approximately seventy (70) or approximately ten (10) degrees and approximately thirty (30) degrees and/or can have a specified number of turns of approximately twenty-five thousandths (0.025) to approximately three (3) or between approximately two tenths (0.2) and two (2).

In one example, the first end 1522 of the locking members 1514 can coincide and be flush with the first end 1504 of the body 1502 and/or the second end 1524 can coincide and be flush with the second end 1506 of the body 1502 such that the locking members 1514 extend from the first end 1504 to the second end 1506. For embodiments in which the locking members 1514 extend from the first end 1504 to the second end 1506, the length $L_{Fc3}$ of the locking members 1514 can be greater than the length $L_{C3}$ of the body 1502.

In one example, the first end 1522 of the locking members 1514 can be offset inwardly from the first end 1504 of the body 1502 and/or the second end 1524 can be offset inwardly from the second end 1506 of the body 1502 such that at least one the ends 1522 or 1524 of the locking members 1514 terminate before reaching the first end 1504 to the second end 1506. As an example, both the first end 1522 and the second end 1524 of the locking members 1514 can be offset inwardly from the first end 1504 and the second end 1506 of the body 1502, the first end 1522 of the locking members 1514 can coincide and be flush with the first end 1504 of the body 1502 and the second end 1524 can be offset inwardly from the second end 1506 of the body 1502 such that the second end 1524 of the locking members 1514 terminate before reaching the second end 1506, or the second end 1524 of the locking members 1514 can coincide and be flush with the second end 1524 of the body 1502 and the first end 1522 can be offset inwardly from the first end 1504 of the body 1502 such that the first end 1522 of the locking members 1514 terminate before reaching the first end 1504.

In one example, the first end 1522 of the locking members 1514 can extend beyond the first end 1504 of the body 1502 and/or the second end 1524 can extend beyond the second end 1506 of the body 1502 such that the locking members 1514 extend from the first end 1504 to the second end 1506.

In one example, the locking members 1514 can be continuous between the first end 1522 and the second end 1524 or discontinuous between the first end 1522 and the second end 1524.

Figure 16A:
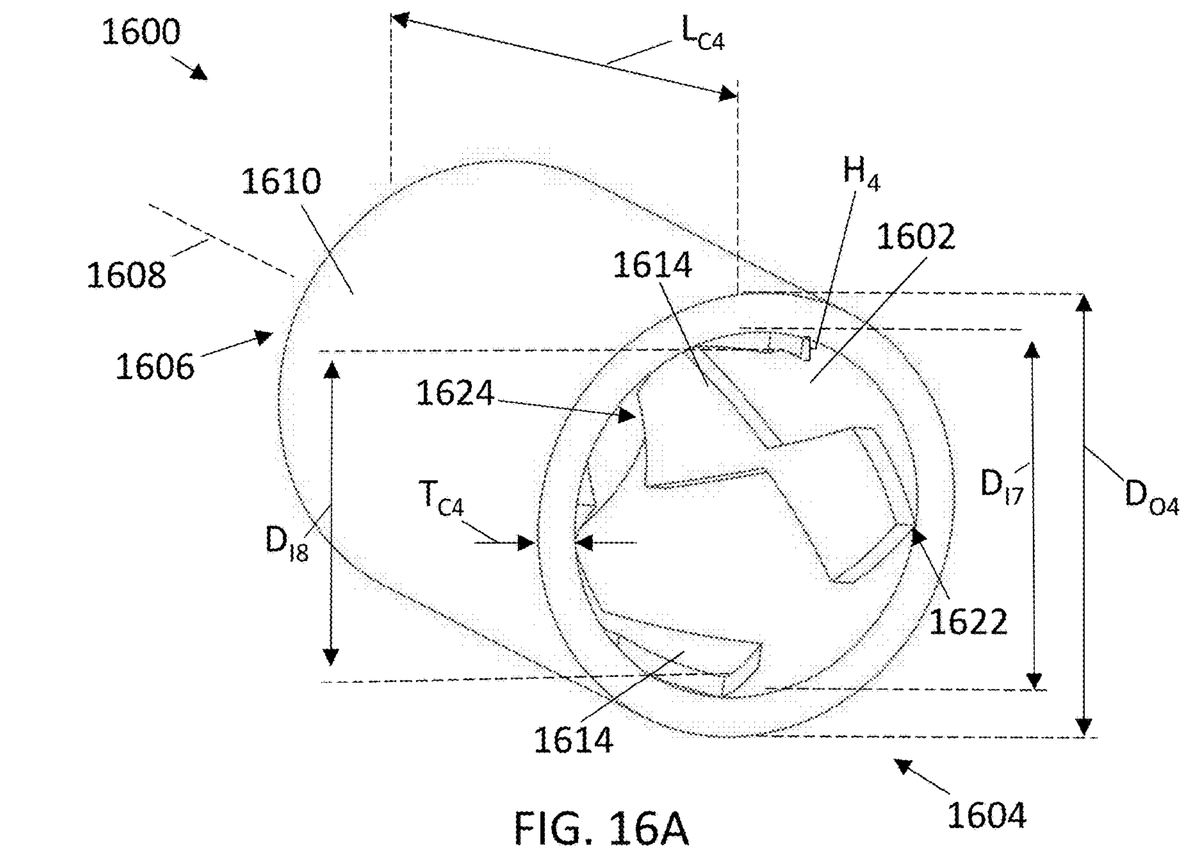
FIG. 16A illustrates a perspective view of yet another example core in accordance with embodiments of the present disclosure.
Figure 16B:
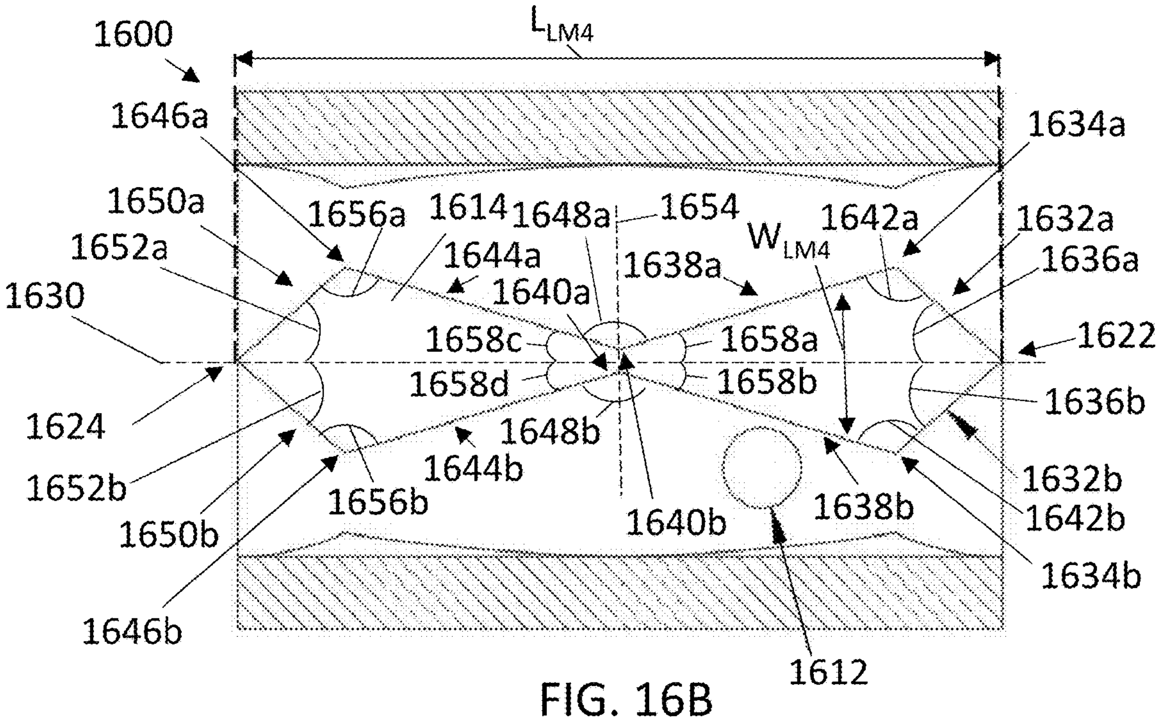
FIG. 16B illustrates a cross-sectional side profile view of the example core of FIG. 16A in accordance with embodiments of the present disclosure.

FIGS. 16A-B illustrate an example self-locking core 1600 in accordance with embodiments of the present disclosure. The self-locking cores 120, 220, 240, 320, and/or 340 can be embodied as the self-locking core 1600. The self-locking core 1600 includes a cylindrical body 1602 having a first base or end 1604 and a second base or end 1606. The cylindrical body 1602 defines a center axis 1608 and a length $L_{C4}$ measured parallel to the center axis 1608 from the first end 1604 to the second end 1606. The length $L_{C4}$ can be specified or otherwise correspond to width of the web of material to be wound about the body 1602. As one example, the length $L_{C4}$ can be between approximately one quarter of an inch and eight inches. As another example, the length $L_{C4}$ can be between approximately two inches and four inches. As another example, the length $L_{C4}$ can be one quarter of an inch, one half of an inch, three quarters of an inch, one inch, two inches, three inches, four inches, five inches, six inches, seven inches, or eight inches. The body 1602 can have an outer surface 1610 and an inner surface 1612, where the inner surface 1612 can include one or more locking members 1614 or two or more locking members 1614. In the present example, the locking members 1614 can define helices along the inner surface 412. The helices can right-handed and/or left-handed helices having multiple helix angles. Embodiments of the core 1600 can include more or fewer locking members 1614.

As shown in FIG. 16A, the body 1602 of the core 1600 can define an outer diameter $D_{04}$ measured perpendicular to the center axis 1608 between two diametrically opposed points on the outer surface 1610 of the body 1602, can define an inner diameter $D_{I7}$ measured perpendicular to the center axis 1608 between two diametrically opposed points on the inner surface 1612 of the body 1602, and can define an inner diameter $D_{I8}$ measured perpendicular to the center axis 1608 between two diametrically opposed points corresponding to a distance $H_4$ that the locking members 1614 extend inwardly from the inner surface 1612. The outer diameter $D_{O4}$ is greater than the inner diameters $D_{I7}$ and $D_{I8}$ and the inner diameter $D_{I8}$ is less than the inner diameter $D_{I7}$. A thickness $T_{C4}$ of the body 1602 can be measured radially relative to the center axis 1608 between inner surface 1612 and the outer surface 1610 and can be the difference between the outer diameter $D_{O4}$ and the inner diameter $D_{I8}$. The locking members 1614 can form ribs that project radially inwardly the distance $H_4$ from the inner surface 1612 generally towards the center axis 1608. The distance $H_4$ can correspond to a difference between the inner diameter $D_{I8}$ and the inner diameter $D_{I7}$. In one example, the distance $H_4$ can be between approximately one half (0.5) millimeters and four (millimeters).

With reference to FIG. 16B, the locking members 1614 can have a length $L_{LM4}$ measured along the locking members 1614 from a first terminal end 1622 of the locking members 1614 to a second terminal end 1624 of the locking members 1614. In one example, in addition to first and second ends 1622 and 1624 being spaced away from each by the length $L_{LM4}$ of the locking members 1614, the second terminal end 1624 can be circumferentially aligned on the inner surface 1612 relative to the first terminal end 1622 along an axial line such that first and second ends 1622 and 1624 of the locking members 1614 are oriented at the same angle relative to the center axis 1608. In one example, the second terminal end 1624 can be offset circumferentially on the inner surface 1612 relative to the first terminal end 1622 by an arc length, a specified non-zero number of radians, and/or a specified non-zero angle relative to the center axis 1608. In one example, a second end 1624 of the locking member can be circumferentially offset relative to a first end 1622 of the locking member by between approximately eight hundredths (0.08) radians and approximately nineteen (19) radians.

In the present example, referring to FIG. 16B, the locking members 1614 can have a width $W_{LM4}$ that varies along the length $L_{LM4}$ of the locking members 1614. As an example, from the first end 1622 of the locking member 1614 to the second end 1624 of the locking member 1614, and relative to an axial line 1630 extend between the first end 1622 and the second end 1624, sides 1632*a* and 1632*b* can extend away from each other so that the width $W_{LM4}$ of the locking member 1614 increases between the first end and first points 1634*a* and 1634*b*. The sides 1632*a* and 1632*b* can extend at angles 1636*a* and 1636*b*, respectively, relative to the axial line 1630. In one example, the angles 1636*a* and 1636*b* can be equal, but opposite from each other (e.g., the angle 1636*a* can be greater than zero and less than 90 degrees and the angle 1636*b* can be less than zero and greater than negative 90 degrees relative to the axial line 1630). In one example, the first end 1622 can be to a point or near point and the sides 1632*a* and 1632*b* can aid in receiving and guiding engagement members from a spindle upon which the core 1600 is to be mounted. From points 1634*a* and 1634*b* to points 1640*a* and 1640*b*, respectively, sides 1638*a* and 1638*b* can extend towards each other so that the width $W_{LM4}$ of the locking member 1614 decreases between the points 1634*a* and 1634*b* and the points 1640*a* and 1640*b*, respectively. In one example, the sides 1632*a* and 1638*a* can define an inside angle 1642*a* and the sides 1632*b* and 1638*b* can define an inside angle 1642*b*. In one example, the inside angles 1642*a* and 1642*b* can be equal to each other. In one example, the angles 1642*a* and 1642*b* can be different from each other. In one example, the angles 1642*a* and 1642*b* can be 90 degrees or greater than 90 degrees and less than 180 degrees. From points 1640*a* and 1640*b* to points 1646*a* and 1646*b*, sides 1644*a* and 1644*b* can extend away from each other so that the width $W_{LM4}$ of the locking member 1614 increases again. In one example, the sides 1638*a* and 1644*a* can define an outside angle 1648*a* and the sides 1638*b* and 1644*b* can define an outside angle 1648*b*. In one example, the outside angles 1648*a* and 1648*b* can be equal to each other. In one example, the angles 1648*a* and 1648*b* can be different from each other. In one example, the angles 1648*a* and 1648*b* can be 90 degrees or greater than 90 degrees and less than 180 degrees. Finally, from points 1646*a* and 1646*b* to the second end 1624, sides 1650*a* and 1650*b* can extend towards each other so that the width $W_{LM}$ of the locking member 1614 decreases again along the axial line 1630. The sides 1650*a* and 1650*b* can extend from the second end 1624 towards to points 1646*a* and 1646*b* at angles 1652*a* and 1652*b*, respectively, relative to the axial line 1630. In one example, the angles 1652*a* and 1652*b* can be equal, but opposite from each other (e.g., the angle 1652*a* can be greater than zero and less than 90 degrees and the angle 1652*b* can be less than zero and greater than negative 90 degrees relative to the axial line 1630). In one example, the second end 1624 can be to a point or near point and the sides 1650*a* and 1650*b* can aid in receiving and guiding engagement members from a spindle upon which the core 1600 is to be mounted. In one example, the locking member 1614 can be symmetrical about the axial line 1630 and/or can be symmetrical about a line 1654 at the midpoint of the length $L_S$ that extends transverse to the axial line 1630.

The locking features 1614 can define multiple helix angles. As an example, a helix angle 1658*a* can be formed between the side 1638*a* and the axial line 1630, a helix angle 1658*b* can be formed between the side 1638*b* and the axial line 1630, a helix angle 1658*c* can be formed between the side 1644*a* and the axial line 1630, and a helix angle 1658*d* can be formed between the side 1644*b* and the axial line 1630. In one example, one or more of the helix angles 1658*a-d* can be different from each other and/or one or more of the helix angles 1658*a-d* can be identical to each other. As one example, each of the helix angles 1658*a-d* are equal to each other. The helix angles 1658*a-d* can be greater than zero (0) degrees and less than ninety (90) degrees, between approximate ten (10) degrees and approximately eighty (80) degrees, between approximately twenty (20) degrees and approximately seventy (70) degrees, or between approximately twenty-five (25) degrees and approximately sixty-five (65) degrees. In one example, the helix angles 1658*a-d* are between approximately thirty (30) and approximately (40) degrees. The sides 1638*a*, 1638*b*, 1644*a*, and 1644*b* can also have a specified pitch and a specified number of turns. As one example, the sides 1638*a*, 1638*b*, 1644*a*, and 1644*b* can have a pitch between approximately five (5) degrees to approximately seventy (70) or approximately ten (10) degrees and approximately thirty (30) degrees and/or can have a specified number of turns of approximately twenty-five thousandths (0.025) to approximately three (3) or between approximately two tenths (0.2) and two (2).

In one example, the locking member 1614 can be defined as two kite-shaped sections that merge at points 1640*a* and 1640*b* (e.g., at or near the midpoint of the length $L_S$). As one example, in the first section, the sides 1632*a* and 1632*b* can be congruent, the sides 1638*a* and 1638*b* can be congruent, the angles 1642*a* and 1642*b* can be congruent, the angles 1636*a* and 1636*b* can be congruent, and/or the axial line 1630 can bisect a line extending between points 1642*a* and 1642*b*. Likewise, for the second section, the sides 1650*a* and 1650*b* can be congruent, the sides 1644*a* and 1644*b* can be congruent, the angles 1656*a* and 1656*b* can be congruent, the angles 1652*a* and 1652*b* can be congruent, and/or the axial line 1630 can bisect a line extending between points 1646*a* and 1646*b*. As an example, the two sections can be general right kite-shaped sections, convex kite-shaped sections, rhombus-shaped kite sections, diamond-shaped kite sections, or square-shaped kite sections.

In one example, the first end 1622 of the locking members 1614 can coincide and be flush with the first end 1604 of the body 1602 and/or the second end 1624 can coincide and be flush with the second end 1606 of the body 1602 such that the locking members 1614 extend from the first end 1604 to the second end 1606.

In one example, the first end 1622 of the locking members 1614 can be offset inwardly from the first end 1604 of the body 1602 and/or the second end 1624 can be offset inwardly from the second end 1606 of the body 1602 such that at least one the ends 1622 or 1624 of the locking members 1614 terminate before reaching the first end 1604 to the second end 1606. As an example, both the first end 1622 and the second end 1624 of the locking members 1614 can be offset inwardly from the first end 1604 and the second end 1606 of the body 1602, the first end 1622 of the locking members 1614 can coincide and be flush with the first end 1604 of the body 1602 and the second end 1624 can be offset inwardly from the second end 1606 of the body 1602 such that the second end 1624 of the locking members 1614 terminate before reaching the second end 1606, or the second end 1624 of the locking members 1614 can coincide and be flush with the second end 1624 of the body 1602 and the first end 1622 can be offset inwardly from the first end 1604 of the body 1602 such that the first end 1622 of the locking members 1614 terminate before reaching the first end 1604.

In one example, the first end 1622 of the locking members 1614 can extend beyond the first end 1604 of the body 1602 and/or the second end 1624 can extend beyond the second end 1606 of the body 1602 such that the locking members 1614 extend from the first end 1604 to the second end 1606.

In one example, the locking members 1614 can be continuous or discontinuous between the first end 1622 and the second end 1624.

In one example, the length $L_{LM4}$ of the locking members 1614 can be greater than the length $L_C$ of the body 1602.

Figure 16C:
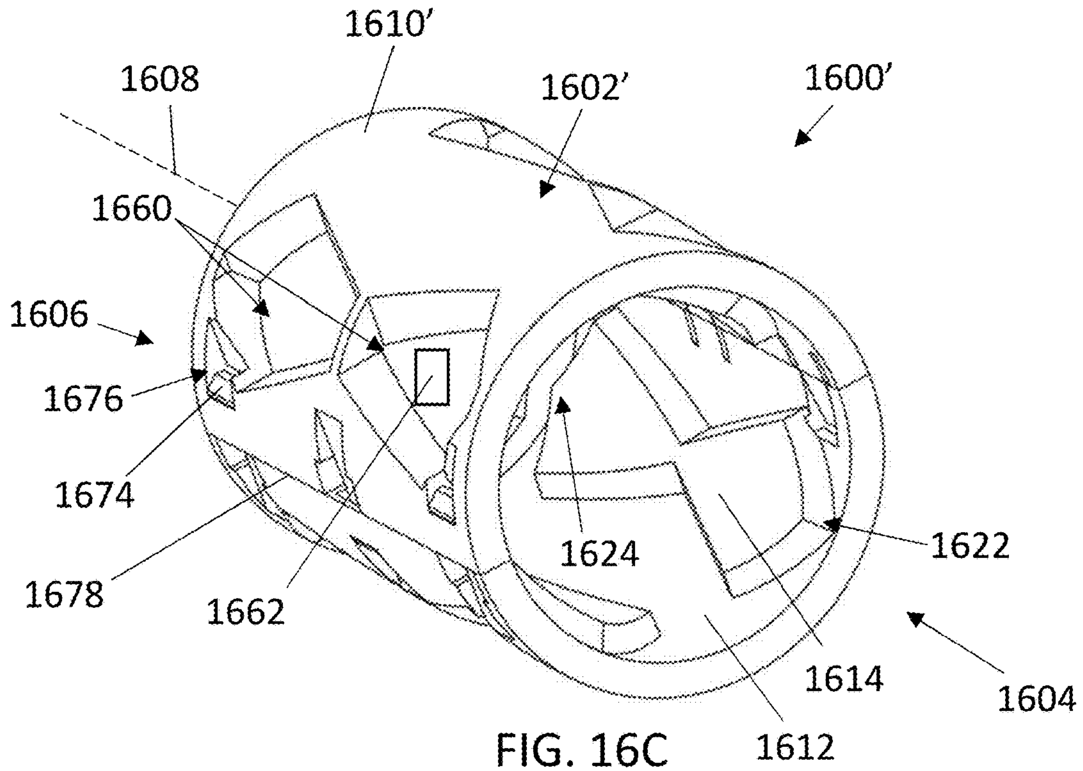
FIG. 16C illustrates a perspective view of yet another example core in accordance with embodiments of the present disclosure.
Figure 16D:
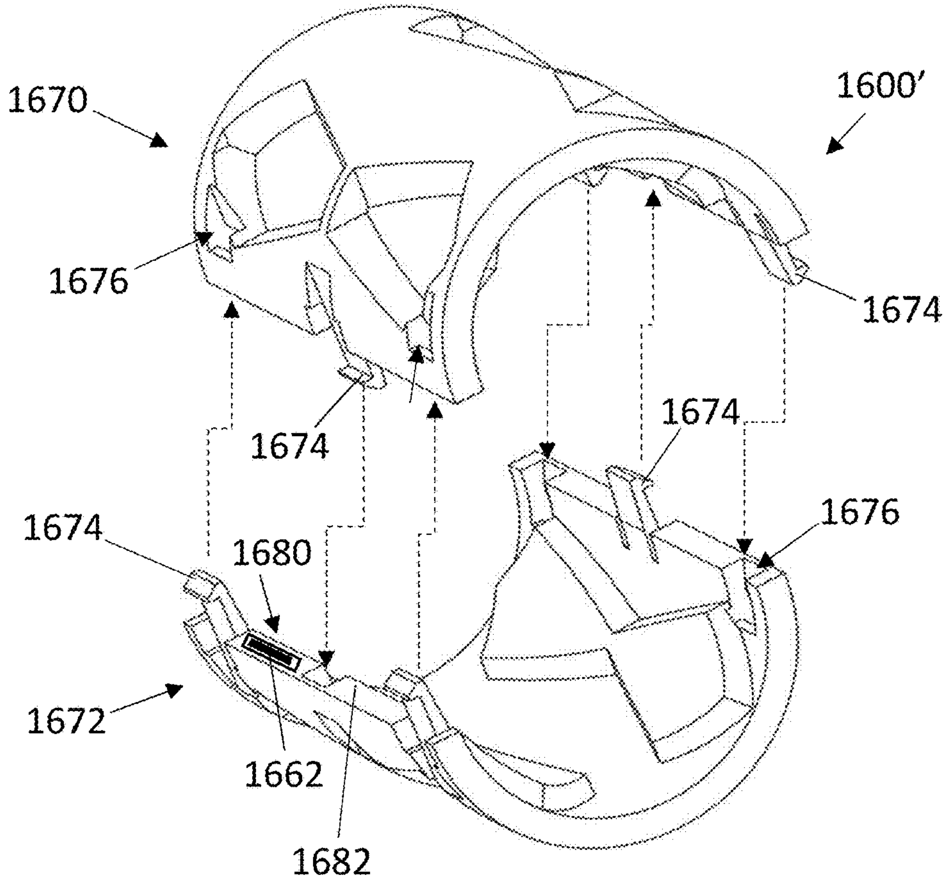
FIG. 16D illustrates a perspective exploded view of the example core shown in FIG. 16C in accordance with embodiments of the present disclosure.

FIGS. 16C-D illustrate an example embodiment of a core 1600' in accordance with embodiments of the present disclosure. The self-locking cores 120, 220, 240, 320, and/or 340 can be embodied as the self-locking core 1600. The core 1600' is similar to the core 1600 except as set forth below and repetitive description of like elements employed in respective embodiments of the cores 1600' and 1600 described herein is omitted for sake of brevity. The core 1600' can have a cylindrical body 1602' formed about the center of axis 1608 and extending from the first end 1604 to the second end 1606. The body 1602' can include the outer surface 1610' and the inner surface 1612, and the inner surface can include the locking members 1614 extending from the first end 1622 to the second end 1624. In the present embodiment, the locking members 1614 can be formed by depressions or recesses in the body 1602' of the core 1600'. The depressions in the body 1602' can form recesses 1660 in the outer surface 1610' of the body 1602' and can form protrusions in the inner surface 1612 corresponding to the locking members 1614. The recesses 1660 can provide a space for receiving a radiofrequency device 1662, such as a radiofrequency identification (RFID) device and/or a near-field communication (NFC) device. The body 1602' can be formed by two sections 1670 and 1672, which can be fit together to complete the body 1602'. In one example, the two sections 1670 and 1672 can be identical to each other. The sections 1670 and 1672 can be joined by corresponding mating members, e.g., including detents 1674 and slots 1676 configured to receive and retain the detents 1674. While the sections 1670 and 1672 have been illustrated as being separate and distinct sections 1670 and 1672, in accordance with embodiments of the present disclosure, the section 1670 and 1672 can be integrally formed to be joined along one side 1678, e.g., by a living hinge. In one example, the section 1672 can include a cavity 1680 formed along a mating edge 1682 of the section 1672 and the radiofrequency device 1662 can be received within the cavity 1680 such that when the sections 1670 and 1672 are joined, the radiofrequency device 1662 is retained within the cavity 1680.

As indicated herein, FIGS. 4-16A-D are provided as example of self-locking cores. Other examples may differ from what is described with regard to FIGS. 4-16A-D. The number and arrangement of devices/components shown in FIGS. 4-16A-D are provided as an example. In practice, there may be additional devices/components, fewer devices/components, different devices/components, or differently arranged devices/components than those shown in FIGS. 4-16A-D. Furthermore, two or more devices/components shown in FIGS. 4-16A-D may be implemented within a single device/component, or a single device/component shown in FIGS. 4-16A-D may be implemented as multiple, distributed devices/components. Additionally, or alternatively, a set of devices/components (e.g., one or more devices/components) shown in FIGS. 4-16A-D may perform one or more functions described as being performed by another set of devices/components shown in FIGS. 4-16A-D.

Figure 17:
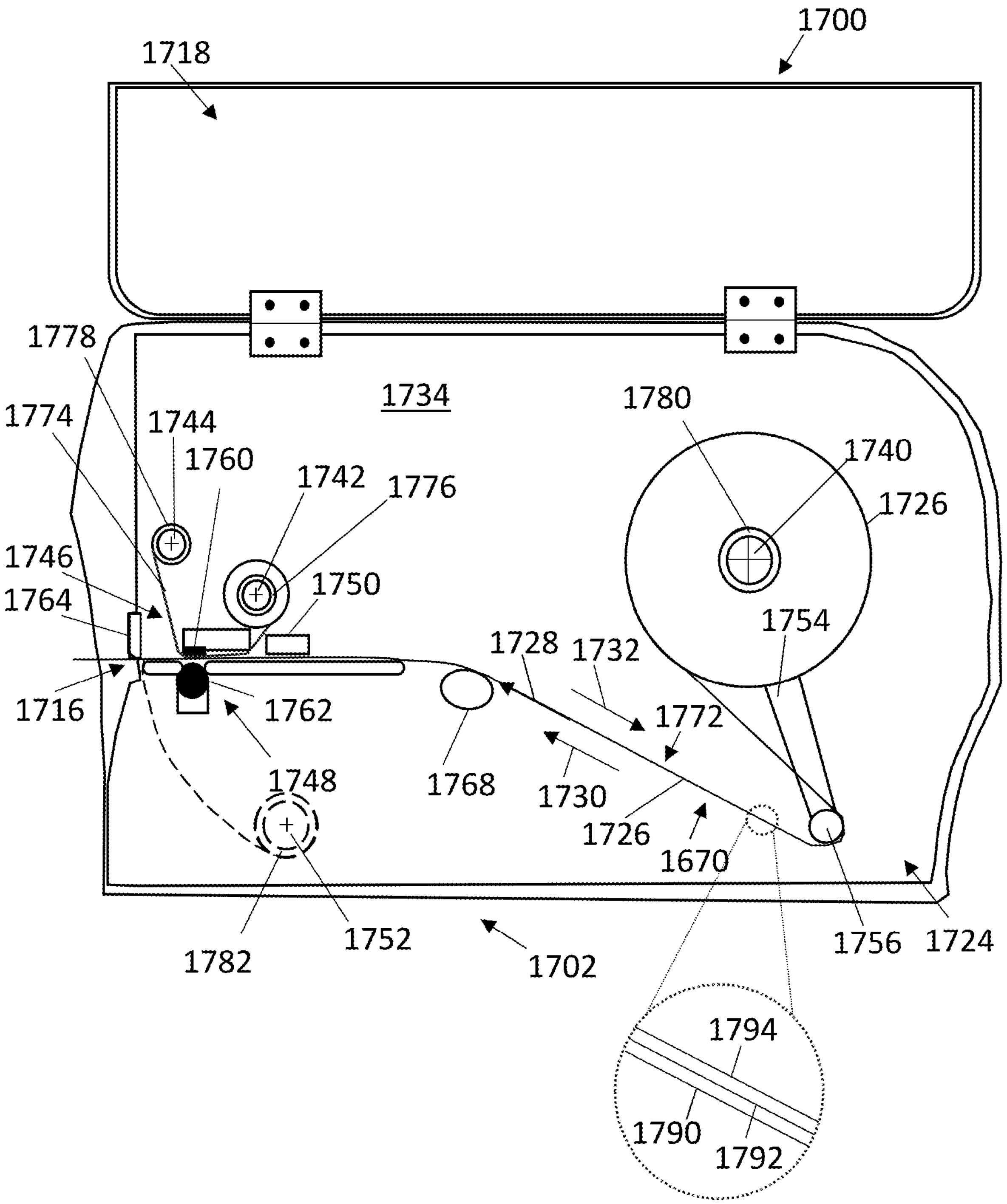
FIG. 17 illustrates an example media processing device with a supply of media installed in accordance with embodiments of the present disclosure.

FIG. 17 illustrates an example of a media processing device 1700 in accordance with embodiments of the present disclosure. The media processing device 1700 can be embodied as a printer (e.g., a direct thermal printer and/or a thermal transfer printer), RFID encoder, and/or other media processing devices. The media processing device 1700 includes a housing 1702. The housing 1702 may include an access door assembly 1718. The housing 1702 may include a media outlet or exit 1716. The media exit may be configured to expel media through a slot after it has been processed. The access door assembly 1718 is illustrated in the open position in FIG. 17, in which at least some of the internal components of the media processing device 1700 may be accessible within an interior cavity 1724 of the housing 1702.

As shown in FIG. 17, when the access door assembly 1718 is in the open position, components for loading and unloading consumable supplies (e.g., a supply of media and/or a supply of an ink ribbon) within internal cavity 1724 can be accessible and components associated with processing media 1726 along a media path 1728 can be viewed. In one example, the media 1726 can be embodied as the supply 100 of media 110 shown in FIG. 1. In another example, the media 1726 can be embodied as the supply 200 of media 210 shown in FIG. 2. A downstream or forward direction of the media path 1728 is denoted by the arrow 1730 and an upstream or reverse direction of the media path 1728 is denoted by arrow 1732.

A chassis 1734 that supports at least some of the components for processing media 1726 along the media path 1728. The chassis 1734 is a structural member configured to support at least some of the internal components in the internal cavity 1724. The electronics, motors, and drive components (e.g., drive trains) of the media processing device 1700 can be in a cavity on the other side of chassis 1734. The electronics, motors, and drive components can control an operation of at least some of the internal components within the internal cavity 1724.

The internal components within the internal cavity 1724 can include a media payout roller or a media supply spindle 1740 that can hold or support a media spool or media roll (e.g., media 1726), a ribbon supply spindle 1742, a ribbon take-up spindle 1744, a printhead assembly 1746, a platen assembly 1748, a RFID encoder 1750, a media take-up roller or spindle 1752, and one or more dancer arms 1754 including one or more rollers 1756 configured to engage the media 1726 at one or more positions along the media path 1728. The media take-up spindle 1752 can be configured to hold the media 1726 or the liner of the media 1726 after the media 1726 is processed. The ribbon supply spindle 1742 can hold a spool of an unused portion of an ink ribbon 1774 wound about a self-locking core 1776, while the ribbon take-up spindle 1744 can hold a spool of a used portion of the ink ribbon 1774 on a self-locking core 1778. In one example, the ink ribbon 1774 can be embodied as the supply 300 of the ink ribbon 310 shown in FIG. 3. The self-locking core 1776 of the ink ribbon 1774 can be secured on the spindle 1742 such that the core 1776 generally does not freely rotate relative to the spindle 1742. Rather, the core 1776 can be "locked" to the spindle 1742 when the ink ribbon 1774 is under tension such that the spindle 1742 and the core 1776 of the ink ribbon 1774 rotate in unison. The self-locking core 1778 can be coupled to a terminal end of the ink ribbon 1774. The self-locking core 1778 can be secured on the spindle 1744 such that the core 1778 generally does not freely rotate relative to the spindle 1744. Rather, the core 1778 can be "locked" to the spindle 1744 when the ink ribbon 1774 is under tension such that the spindle 1744 and the core 1778 rotate in unison. In one example, the self-locking cores 1776 and 1778 can be embodied as one of the self-locking cores 400, 1000, 1500, 1600, or 1600' shown in FIGS. 4-9, 10-13, 15, 16A-B, and 16C-D, respectively. While an embodiment of the media processing device 1700 has been illustrated to include ribbon supply and take-up spindles 1742 and 1744, respectively, embodiments of the media processing device 1700 may not include ribbon supply and take-up spindles 1742 and 1744, e.g., for embodiments of the media processing device that do not require an ink ribbon to print on media 1726 (e.g., embodiments implemented via direct thermal printing).

The printhead assembly 1746 can include a printhead 1760 (e.g., a thermal printhead). The one or more platen assembly 1748 can include a platen roller 1762. After the printhead 1760 prints on the media 1726 (e.g., via the ribbon or direct thermal) and/or the RFID/NFC encoder encodes an RFID/NFC inlay on the media 1726, the media 1726 can be dispensed from the media processing device 1700 via the media exit 1716 and cut by a cutting assembly 1764 or can be wound about the media take-up spindle 1752. In some example individual media elements can be held on a continuous web of media via the liner such that a cutter is not required at the media exit 1716.

The chassis 1734 supports the media supply spindle 1740, the ribbon supply spindle 1742, the take-up spindle 1744, the printhead assembly 1746, the platen assembly 1748, the RFID/NFC encoder 1750, the media take-up spindle 1752, the dancer arm 1754, and/or the cutting assembly 1764, as well as the electronics and drive components (e.g., motors; drive trains; etc.) behind the chassis 1734 operatively coupled to the media supply spindle 1740, the ribbon supply spindle 1742, the ribbon take-up spindle 1744, the RFID/NFC encoder 1750, the printhead 1760, the platen roller 1762, and/or the media take-up spindle 1752 to control (e.g., via a logic circuit) the media supply spindle 1740, the ribbon supply spindle 1742, the ribbon take-up spindle 1744, the RFID/NFC encoder 1750, the printhead 1760, and/or the platen roller 1762 (e.g., to rotate the media supply spindle 1740, the ribbon supply spindle 1742, the ribbon take-up spindle 1744, the platen roller 1762, the media take-up spindle 1752, and/or the cutter 1764; and/or to energize the RFID/NFC encoder 1750 and/or the printhead 1760).

In an example operation with reference to FIG. 17, before a printing and/or encoding operation may begin, the media 1726 is loaded into the media processing device 1700. The supply of media 1726 (e.g., a media roll) can include a self-locking core 1780 that can be supported by the spindle 1740 and the media 1726 can be routed along the media path 1728 from the media supply and past the printhead 1760 and platen roller 1762. The self-locking core 1780 of the media roll can be secured on the spindle 1740 such that the media generally does not freely rotate relative to the spindle. Rather, the core 1780 can be "locked" to the spindle 1740 when the media 1726 is under tension such that the spindle 1740 and the core 1780 of the media roll rotate in unison. In one example, the media 1726 can also include another self-locking core 1782 coupled to a terminal end of the media 1726 or a liner 1790 of the media 1726. The self-locking core 1782 can be secured on the spindle 1752 such that the media generally does not freely rotate relative to the spindle 1752. Rather, the core 1782 can be "locked" to the spindle 1740 when the media 1726 is under tension such that the spindle 1752 and the core 1782 rotate in unison. In one example, the self-locking cores 1780 and 1782 can be embodied as one of the self-locking cores 400, 1000, 1500, 1600, or 1600' shown in FIGS. 4-9, 10-13, 15, 16A-B, and 16C-D, respectively. One or more media guides 1768 can support and guide the media 1726 along the media path 1728. The continuous web of media 1726 can be coated on one surface 1770 with a pressure sensitive adhesive 1792 and can include a printable surface 1794 on the opposite side 1772. For thermal transfer printing, the printable surface 1794 of the media is configured to receive a pigment (e.g., resin, wax-resin, etc.) that is transferred from an ink ribbon 1774 installed on the ribbon supply and take-up spindles 1742 and 1744, respectively. For direct thermal printing, a thermal printhead of the media processing device 1700 directly contacts the printable surface 1794 triggering a chemical or physical change in a thermally sensitive dye covering at least a portion of the printable surface 1794 of the media 1726.

After the media 1726 is loaded into the internal cavity 1724 and fed through the media path 1728 past a print mechanism formed by the printhead 1760 and the platen roller 1762. The platen roller 1762 can be driven by a platen drive motor, e.g., via a platen drive train, to rotate about an axis of rotation of the platen roller 1762 (platen axis of rotation) at a specified platen or a print speed to pull the media 1726 along the media path 1728. In one example, the media 1726 can be biased by the media payout motor to generate a counterforce that opposes the driving force produced by the rotation of the platen roller 1762 (e.g., based on the speed of the motor being used to dispense the media 1726) to maintain tension in the web of media 1726 as it is pulled along the media path 1728 through the media processing device 1700 by the platen roller 1762 and the media 1726 can be biased by the driving force of the media take-up motor on the spindle 1752 (e.g., based on the speed of the motor being used to wind the media 1726 or the liner 1790 associated with the media 1726) to maintain tension in the web of media 1726 as it is pulled along the media path 1728 through the media processing device 1700 by the platen roller 1762.

Once printed and/or encoded, the printed portion of the media 1726 is advanced outwardly from the media processing device 1700 through a media exit 1716 by the platen roller assembly 1748 where it can be peeled, cut, and/or torn to separate the printed and/or encoded media from the media supply e.g., the cutting assembly 1764 can be disposed proximate to the media outlet 1716 (e.g., between the printing mechanism and the media outlet) to cut the media as it exits the media outlet 1716. Alternatively, the printed and/or encoded media (or the liner of the media) can be wound about the media take-up spindle 1752.

Figure 18:
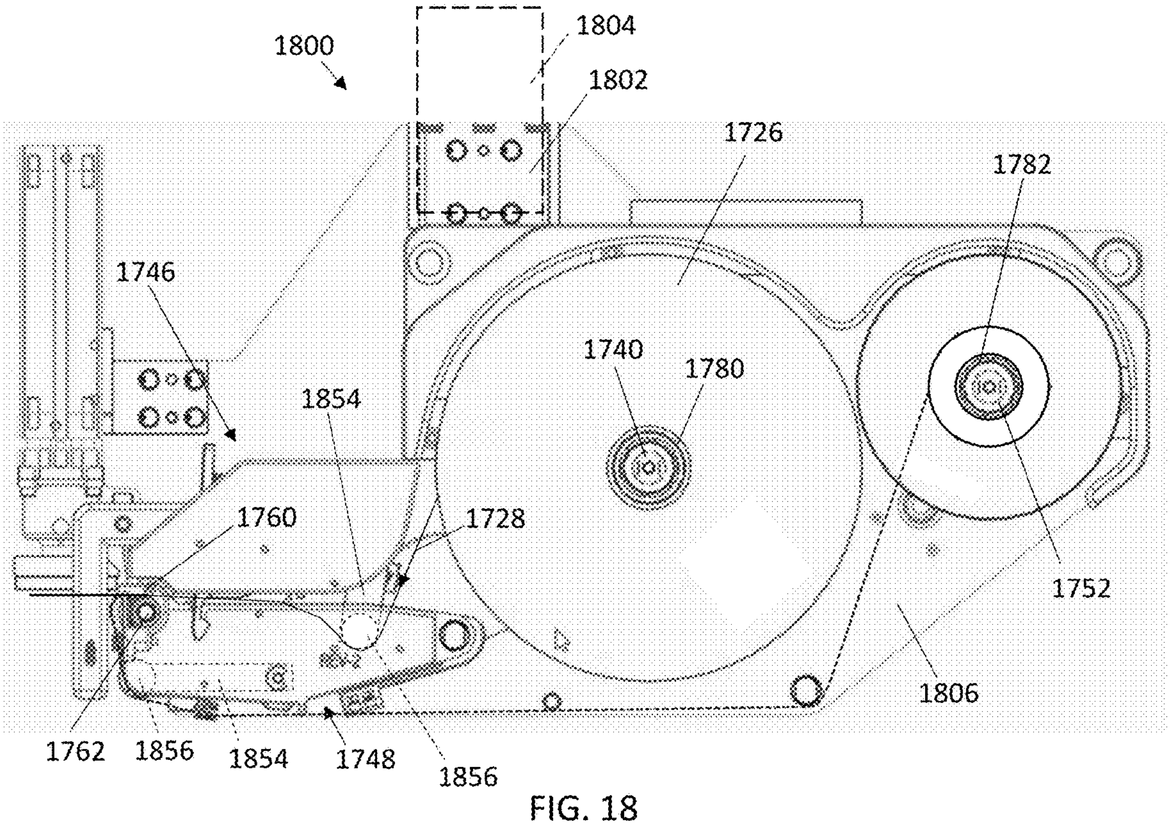
FIG. 18 illustrates another example media processing device with a supply of media installed in accordance with embodiments of the present disclosure.

FIG. 18 illustrates an example media processing device 1800 which has a different arrangement of the media processing components. The media processing device can include a coupler 1802 configured to operatively couple the media processing device 1800 to a robotic device 1804, such as a robotic arm, to facilitate autonomous movement and operation of the media processing device 1800. As shown in FIG. 18, the media processing device 1800 includes the media supply spindle 1740 supporting the media 1726, the printhead assembly 1746 including the printhead 1760, the platen assembly 1748 including the platen 1762, the media take-up spindle 1752, and the dancer arms 1854 and the associated roller 1856, each of which can be supported by a chassis 1806. The media processing device 1800 can also include electronics, motors, and drive components (e.g., drive trains) on the other side of chassis 1806. The electronics, motors, and drive components can control an operation of the media supply spindle 1740 supporting the media 1726, the printhead assembly 1746 including the printhead 1760, the platen assembly 1748 including the platen 1762, the media take-up spindle 1752, and/or the dancer arms 1854.

In one example, the media 1726 can be embodied as the supply 100 of media 110 shown in FIG. 1. In another example, the media 1726 can be embodied as the supply 200 of media 210 shown in FIG. 2. As described herein, the supply of media 1726 (e.g., a media roll) can include a self-locking core 1780 that can be supported by the spindle 1740 and the media 1726 can be routed along a media path 1828 from the media supply and past the printhead 1760 and platen roller 1762. The self-locking core 1780 of the media roll can be secured on the spindle 1740 such that the media generally does not freely rotate relative to the spindle. Rather, the core 1780 can be "locked" to the spindle 1740 when the media 1726 is under tension such that the spindle 1740 and the core of the media roll rotate in unison. In one example, the media 1726 can also include another self-locking core 1782 coupled to a terminal end of the media 1726 or a liner of the media 1726. The self-locking core 1782 can be secured on the spindle 1752 such that the media generally does not freely rotate relative to the spindle 1752. Rather, the core 1782 can be "locked" to the spindle 1740 when the media 1726 is under tension such that the spindle 1752 and the core 1752 rotate in unison. In one example, the self-locking cores 1780 and 1782 can be embodied as one of the self-locking cores 400, 1000, 1500, 1600, or 1600' shown in FIGS. 4-9, 10-13, 15, 16A-B, and 16C-D, respectively.

In one example, the robotic device 1804 can be autonomously controlled (e.g., by the controller) to move the media processing device relative to objects being transported on a conveyer and the media processing device can be controlled to print, encode, and/or apply media to the objects as the object move along the conveyer. The robotic device 110 can also be autonomously controlled to move the media processing device 1800 into position relative to a media replenishment system to facilitate replenishment of media. The media processing device 1800 can relieve the tension along a media path 1828 to unlock the self-locking cores and can discard the spent cores in a receptacle, after which the media processing device 1800 can interact with the media replenishment system for autonomous installation of another supply of media 1726 in media processing device. For example, self-locking cores of the supply of media 1726 can be urged onto the spindles 1740 and 1752 and a length of media can be positioned between the printhead 1762 and the platen roller 1762, after which the media processing device 1800 can apply tension to the media along the media path 1828 causing the self-locking cores to be locked to the spindles 1740 and 1752.

Figure 19:
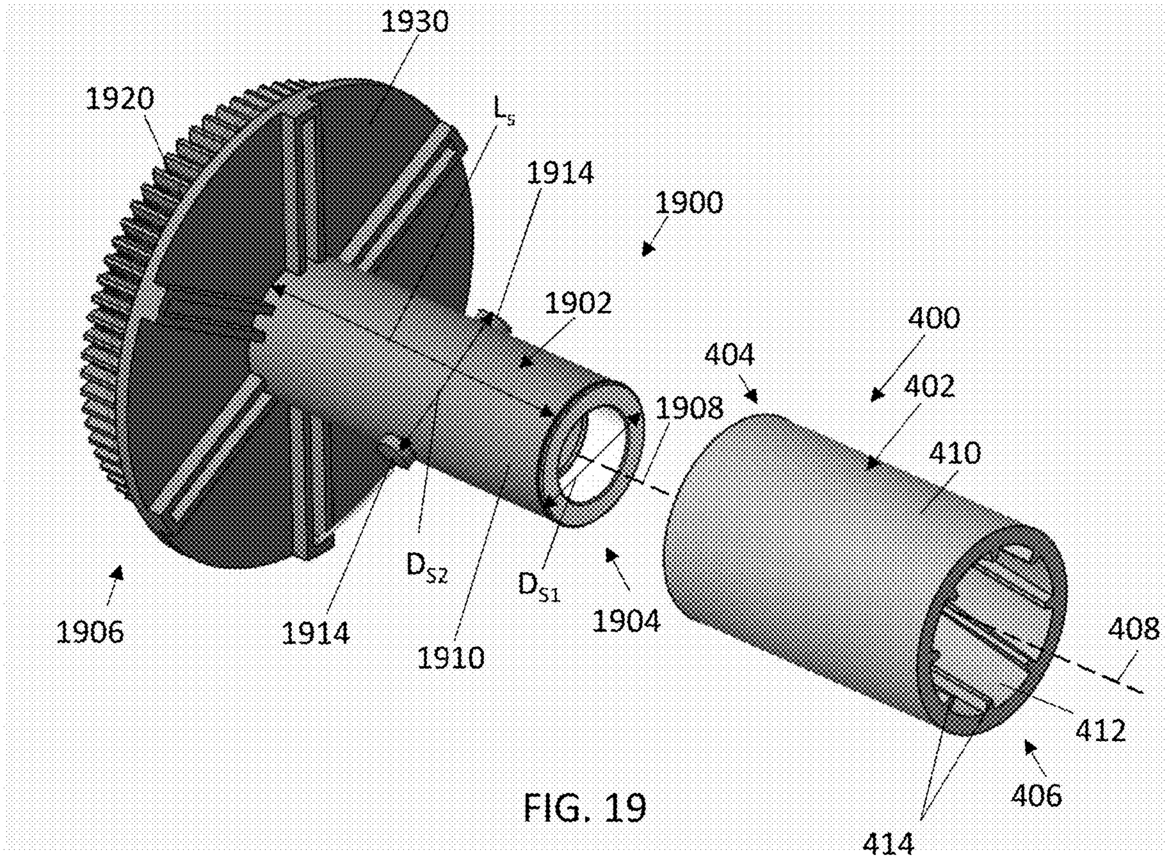
FIG. 19 illustrates an example spindle of a media processing device for receiving a self-locking core in accordance with embodiments of the present disclosure.
Figure 20:
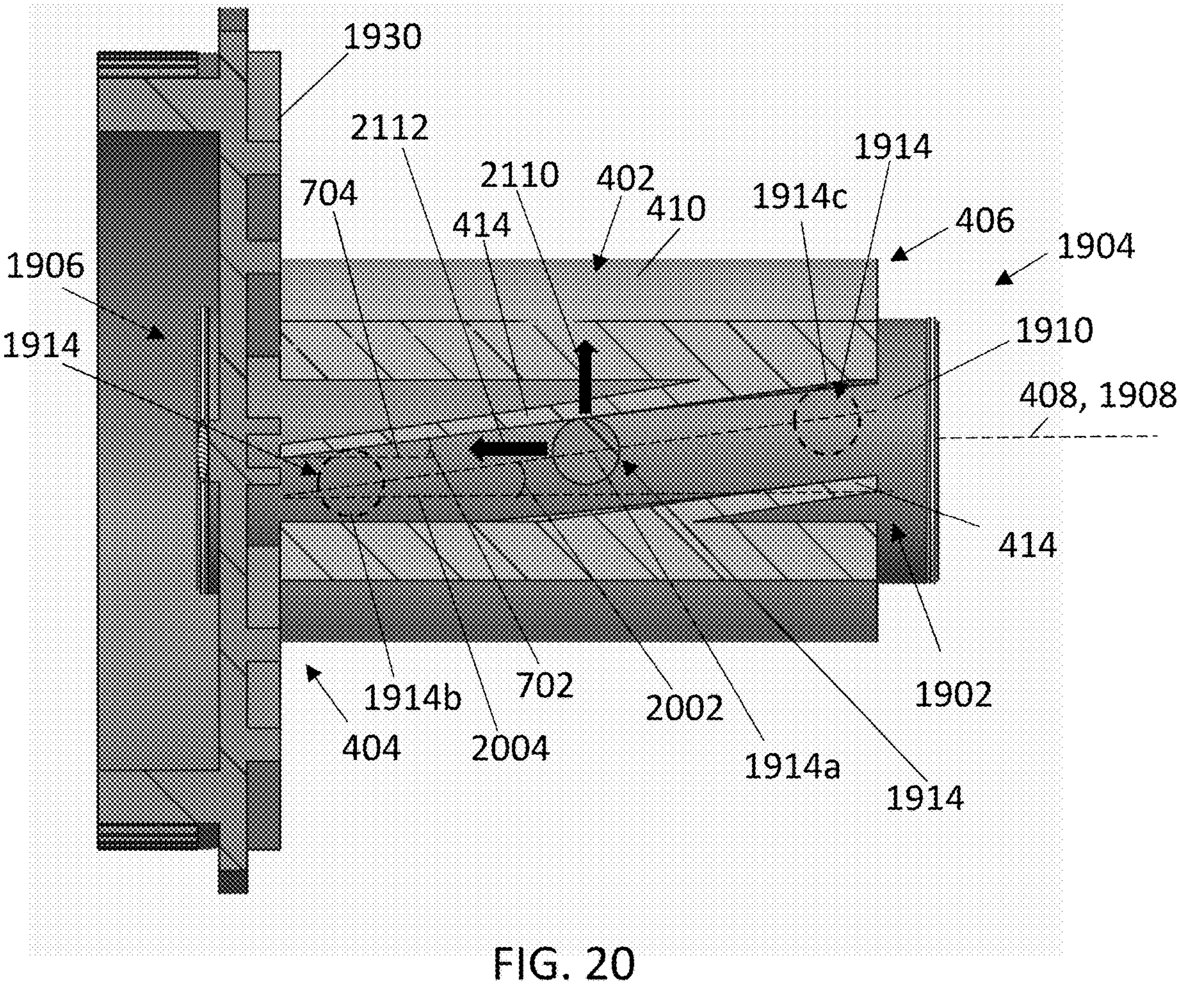
FIGS. 20-21 illustrate an example self-locking core installed on the spindle of the media processing device in accordance with embodiments of the present disclosure.
Figure 21:
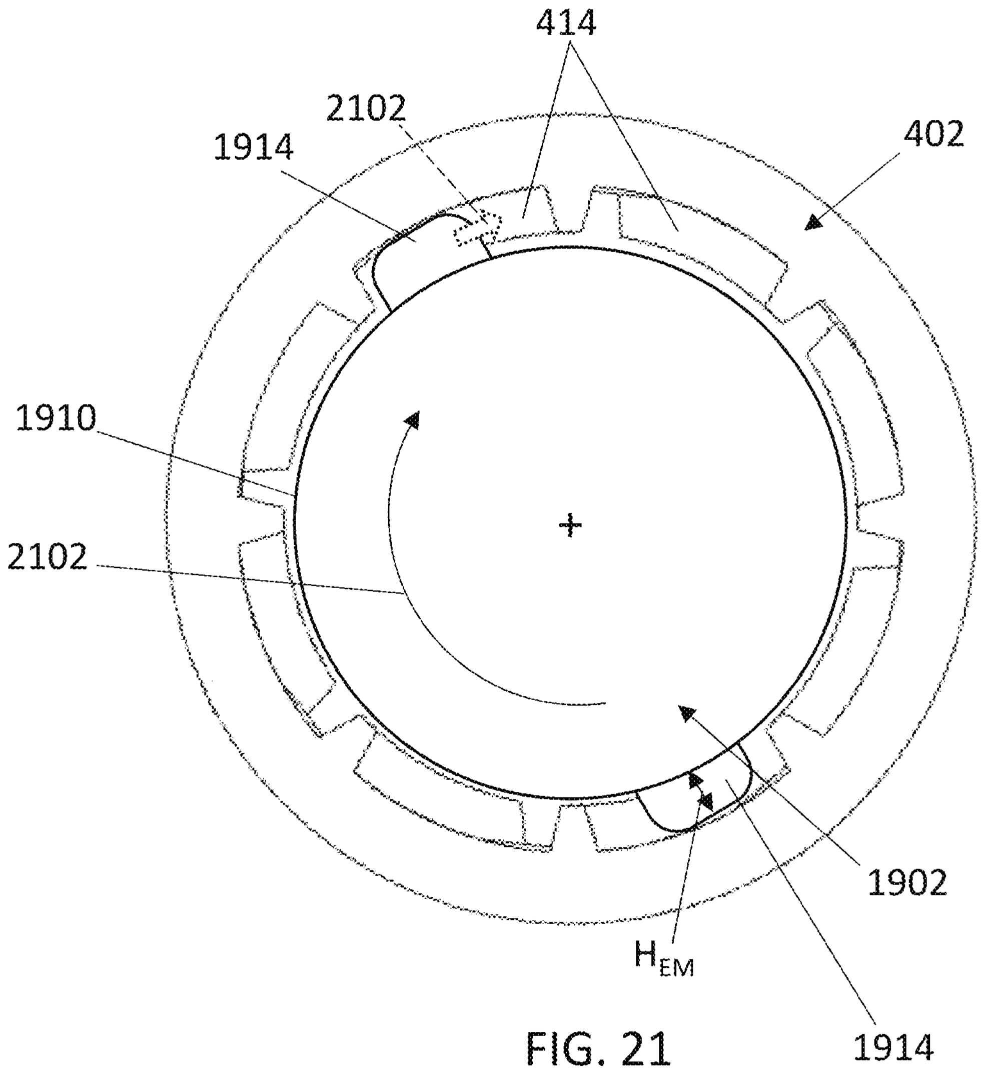

FIGS. 19-21 illustrate an example spindle 1900 of a media processing device for receiving the self-locking core 400 in accordance with embodiments of the present disclosure. In one example, the spindle 1900 can be implemented as spindles 1740, 1742, 1744, and/or 1752 of the media processing devices 1700 and 1800 shown in FIGS. 17 and 18. While the self-locking core 400 is illustrated as an example in FIGS. 19 and 20, the self-locking core 1000 can also be used to interface with the spindle 1900 instead of the self-locking core 400.

The spindle 1900 includes a spindle shaft 1902 having a generally cylindrical body extending from a first end 1904 and a second end 1906. The second end of the shaft can include a portion of a drive train (e.g., a gear 1920) to be operatively driven (e.g., via a motor) to rotate the spindle shaft 1902. The spindle shaft 1902 defines a center axis 1908 about which the spindle shaft rotates and a length $L_S$ measured parallel to the center axis 1908 from the first end 1904 to the second end 1906. The length $L_S$ can be specified or otherwise correspond to length $L_C$ of the core 400. As one example, the length $L_S$ can be equal to or greater than the length $L_C$. The shaft 1902 can have an outer surface 1910, where the outer surface 1910 can include one or more engagement members 1914. The engagement members 1914 can extend radially from the spindle shaft 1902 a specified distance $H_{EM}$. The engagement members 1914 can be disposed circumferential about the shaft 1902 and/or can disposed at one or more positions along the length $L_S$ of the shaft 1902. As an example, a group of the engagement members 1914 may be diametric opposed from one another, e.g., one of the engagement members 1914 can be circumferentially offset from another one of the engagement members 1914 by 180 degrees) or can be circumferentially offset from each other by an angle other than 180 degrees, e.g., by 90 degrees, 120 degrees, or other angles. The engagement member 1914 can also be disposed along a length $L_S$ of the shaft 1902 at different locations. As an example, the engagement members can be positioned at a midpoint of the length $L_S$ of the shaft 1902 (e.g., shown in FIG. 20 as the engagement member 1914*a*), can be disposed at the first end 1904 of the shaft 1902 or proximate to the first end 1904 of the shaft 1902 between the first end 1904 and the midpoint (e.g., shown in FIG. 20 as the engagement member 1914*b*), or can be disposed at the second end 1906 of the shaft 1902 or proximate to the second end 1906 of the shaft 1902 between the second end 1906 and the midpoint (e.g., shown in FIG. 20 as the engagement member 1914*c*). In one example, the shaft 1902 can include a group of two or more of the engagement members positioned along the length $L_S$ of the shaft 1902. For example, as shown in FIG. 20, in one embodiment, the shaft 1902 can include the engagement members 1914*a-c*. The engagement members 1914*a-c* can be disposed along the length $L_S$ of the shaft 1902 and can be circumferentially offset from each other. The engagement members 1914_a-c_ can be circumferentially offset from each other by an angle 2002 measured between the engagement members 1914_a-c_ and an axial line 2004 one the outer surface 1910 that is parallel to the center axis 1908 and that extends at a fixed angle along its length relative to the center axis 1908. The angle 2002 at which the engagement members 1914_a-c_ are circumferential offset from each other can correspond to the helix angle 702 of the locking features 414 such that engagement members 1914_a-c_ can engage one of the locking features 414 at different points along the length $L_S$ of the shaft 1902.

In one example, the engagement members 1914 can be lugs that project from or relative to the outer surface 1910 of the spindle shaft 1902. The spindle shaft 1902 can define a diameter $D_{S1}$ measured perpendicular to the center axis 1908 between two diametrically opposed points on the outer surface 1910 of the spindle shaft 1902. A diameter $D_{S2}$ measured perpendicular to the center axis 1908 between two diametrically opposed points on the engagement members can be defined for embodiments in which the engagement members 1914 are diametrically opposed. In one example, the distance $H_{EM}$ can be equal to or less than the distance H (FIG. 5) that the locking members 414 project inwardly from the inner surface 412 of the core 400 and/or the diameter $D_{S1}$ can be less than diameter $D_{I2}$ (FIG. 5) of the core 400. As one example, the diameter $D_{S1}$ can be on the order of micrometer or millimeters less than the diameter $D_{I2}$ to allow the core 400 to slide onto the spindle shaft 1902 while ensuring a secure and stable fit between the core 400 and the spindle shaft 1902. Similarly, the diameter $D_{S2}$ can be greater that the diameter $D_{I2}$ and less than the diameter $D_{I1}$ of the core 400. As one example, the diameter $D_{S2}$ can be on the order of micrometer or millimeters less than the diameter $D_{I1}$ to allow the core 400 to slide onto the spindle shaft 1902 while ensuring a secure and stable fit between the core 400 and the spindle shaft 1902. The distance $H_{EF}$ that the engagement members extend from the spindle shaft 1902 can cause the engagement members to extend beyond the diameter $D_{I2}$ when the core 400 is mounted on the spindle shaft 1902 as shown in FIGS. 20-21.

Once the core 400 is at least partially mounted on the spindle shaft 1902, the spindle shaft 1902 may rotate in a locking direction 2102 (e.g., clockwise in the orientation shown in FIG. 21) causing the engagement members 1914 to engage the locking members 414 denoted by arrow 2110 which in turn applies a force to the locking members 414 in the direction of the arrow 2110. Since the locking members for helices with non-zero helix angles (e.g., angle 702 shown in FIG. 7), a force in the direction of arrow 2112, towards the second end 1906 is also generated, which can have the effect of pulling the core towards the second end 1906 against a base flange 1930, locking the core to the spindle shaft 1902, and generally preventing the core from being removed from the spindle shaft when the force is being applied. When the force applied to the locking members 414 by the engagement members 1914 ceases, the core 400 is no longer locked on the spindle shaft 1902 and can be removed (e.g., slide off the shaft spindle towards the first end 1904 with minimal force).

As an example, with reference to FIGS. 18-21, the spindles 1740 and 1752 can be motorized, and can apply tension to the media web 1726 after it is installed in the media processing device 1800. This tension causes the cores 400 to rotate on the spindles 1740 and 1752 until the engagement members contact the locking members 414. Due to the helical shape of the locking members 414, a portion of the tension force is applied in the axial direction against the base flange 1930 of the spindles 1740 and 1752, securing the cores 400 to the spindles 1740 and 1752 during printer operations. When the media supply is exhausted, the web tension ceases to exist, along with the axial retaining forces and the cores 400 are free to slide off the ends of the spindles 1740 and 1752, if for example, the media processing device 1800 is tilted to one side by the robotic device 1804.

While FIGS. 19-21 are illustrate using an embodiment of the core 400, any one of the cores 1000, 1500, and 1600 can engage the spindle 1900 and the corresponding engagement members 1914 in a manner that is similar to the core 400 and are not repeated herein for the sake of brevity. However, with respect to the core 1600, the locking members 1614 provide for locking the core 1600 to the spindle 1900 when the spindle rotates in a first direction (e.g., clockwise) and provides for locking the core 1600 to the spindle 1900 when the spindle 1900 rotates in a second direction (e.g., counterclockwise). When the tension on the core 1600 is released, the core 1600 can slide off of the spindle 1900.

As indicated herein, FIGS. 17-21 are provided as example media processing devices and components thereof. Other examples may differ from what is described with regard to FIGS. 17-21. The number and arrangement of devices/components shown in FIGS. 17-21 are provided as an example. In practice, there may be additional devices/components, fewer devices/components, different devices/components, or differently arranged devices/components than those shown in FIGS. 17-21. Furthermore, two or more devices/components shown in FIGS. 17-21 may be implemented within a single device/component, or a single device/component shown in FIGS. 17-21 may be implemented as multiple, distributed devices/components. Additionally, or alternatively, a set of devices/components (e.g., one or more devices/components) shown in FIGS. 17-21 may perform one or more functions described as being performed by another set of devices/components shown in FIGS. 17-21.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any member disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential members or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . aa", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various members are grouped together in various embodiments for the purpose of streamlining the disclosure. This method of disclosure is not to be interpreted as reflecting an intention that the claimed embodiments require more members than are expressly recited in each claim. Rather, as the following claims reflect, inventive subject matter may lie in less than all members of a single disclosed embodiment. Thus, the following claims are hereby incorporated into the Detailed Description, with each claim standing on its own as a separately claimed subject matter.

The invention claimed is:

1. A supply of printable media comprising:
- a first self-locking core;
- a web of printable media wound about the first self-locking core, the printable media including a printable surface on first side, an adhesive on a second side, and a liner releasably secured to the adhesive; and
- a second self-locking core, a terminal end of the liner being secured to the second self-locking core,
- at least one of the first self-locking core or the second self-locking includes:
  - a cylindrical body defining a center axis, the cylindrical body having an outer surface and an inner surface; and
  - a locking member formed along the inner surface of the cylindrical body, the locking member extending radially inward towards the center axis and forming a helix having a non-zero helix angle along the inner surface.

2. The supply of printable media of claim 1, wherein the locking member is discontinuous between a first end of the locking member and a second end of the locking member.

3. The supply of printable media of claim 1, wherein the locking member is continuous between a first end of the locking member and a second end of the locking member.

4. The supply of printable media of claim 1, wherein the locking member extends along the inner surface from a first end of the cylindrical body to a second end of the cylindrical body.

5. The supply of printable media of claim 1, wherein the locking member is one of a plurality of lock members formed along the inner surface, and each of the plurality of locking members has the non-zero helix angle.

6. The supply of printable media of claim 5, wherein a first end of the locking member is flush with or offset inwardly from a first end of the cylindrical body and a second end of the locking member is flush with or offset inwardly from a second end of the cylindrical body.

7. The supply of printable media of claim 1, wherein the non-zero helix angle is greater than ten (10) degrees and less than eighty (80) degrees.

8. The supply of printable media of claim 1, wherein a pitch of the locking member is between five (5) degrees and seventy (70) degrees.

9. The supply of printable media of claim 1, wherein a number of turns of the locking member is between twenty-five thousandths (0.025) and three (3).

10. The supply of printable media of claim 1, wherein a second end of the locking member is circumferentially offset relative to a first end of the locking member by between eight hundredths (0.08) radians and nineteen (19) radians.

11. The supply of printable media of claim 1, wherein the locking member forms a rib along the inner surface of the cylindrical body and extends radially inward from the inner surface by between one half (0.5) millimeters and four (4) millimeters.

12. A method of forming a supply of printable media comprising:
- winding a web of printable media about a first self-locking core, the printable media including a printable surface on a first side, an adhesive on a second side, and a liner releasably secured to the adhesive; and
- securing a terminal end of the liner to a second self-locking core,
- at least one of the first self-locking core or the second self-locking includes:
  - a cylindrical body defining a center axis, the cylindrical body having an outer surface and an inner surface; and
  - a locking member formed along the inner surface of the cylindrical body, the locking member extending radially inward towards the center axis and forming a helix having a non-zero helix angle along the inner surface.

13. The method of claim 12, wherein the locking member extends along the inner surface from a first end of the cylindrical body to a second end of the cylindrical body.

14. The method of claim 12, wherein a length of the locking member is greater than a length of the cylindrical body.

15. The method of claim 14, wherein a first end of the locking member is flush with or offset inwardly from a first end of the cylindrical body and a second end of the locking member is flush with or offset inwardly from a second end of the cylindrical body.

16. The method of claim 12, wherein the non-zero helix angle is greater than ten degrees and less than eighty degrees.

17. The method of claim 12, wherein a pitch of the locking member is between five (5) degrees and seventy (70) degrees.

18. The method of claim 12, wherein a number of turns of the locking member is between twenty-five thousandths (0.025) and three (3).

19. The method of claim 12, wherein a second end of the locking member is circumferentially offset relative to a first end of the locking member by between eight hundredths (0.08) radians and nineteen (19) radians.

20. The method of claim 12, wherein the locking member forms a rib along the inner surface of the cylindrical body and extends radially inward from the inner surface by between one half (0.5) millimeters and four (4) millimeters.

* * * * *